United States Patent [19]
Furukawa et al.

[11] Patent Number: 6,136,473
[45] Date of Patent: Oct. 24, 2000

[54] HYDROGEN ABSORBING ELECTRODE, NICKEL ELECTRODE AND ALKALINE STORAGE BATTERY

[75] Inventors: Kengo Furukawa; Toshiki Tanaka; Hiroe Nakagawa; Yuichi Matsumura; Minoru Kuzuhara; Masuhiro Ohnishi; Noboru Miyake; Masaharu Watada; Masahiko Oshitani, all of Osaka, Japan

[73] Assignee: Yuasa Corporation, Takatsuki, Japan

[21] Appl. No.: 08/849,103

[22] PCT Filed: Sep. 25, 1996

[86] PCT No.: PCT/JP96/02761

§ 371 Date: May 22, 1997

§ 102(e) Date: May 22, 1997

[87] PCT Pub. No.: WO97/12408

PCT Pub. Date: Apr. 3, 1997

[30] Foreign Application Priority Data

| | | | |
|---|---|---|---|
| Sep. 28, 1995 | [JP] | Japan | 7-250986 |
| Dec. 28, 1995 | [JP] | Japan | 7-342627 |
| Jan. 23, 1996 | [JP] | Japan | 8-08882 |
| Feb. 9, 1996 | [JP] | Japan | 8-023752 |
| Mar. 29, 1996 | [JP] | Japan | 8-075519 |
| Jul. 29, 1996 | [JP] | Japan | 8-199316 |

[51] Int. Cl.$^7$ ................................ H01M 4/24
[52] U.S. Cl. ............... 429/218.2; 429/223; 420/900
[58] Field of Search ............... 429/101, 59, 218, 429/223, 218.2; 420/900

[56] References Cited

U.S. PATENT DOCUMENTS

| | | | |
|---|---|---|---|
| 5,512,385 | 4/1996 | Komori et al. | 429/101 |
| 5,525,435 | 6/1996 | Pourarian | 429/218 |
| 5,571,636 | 11/1996 | Ohta et al. | 429/218 |
| 5,654,115 | 8/1997 | Hasebe et al. | 429/218 |
| 5,804,334 | 9/1998 | Yamamura et al. | 429/218 |

FOREIGN PATENT DOCUMENTS

| | | |
|---|---|---|
| 48-48931 | 7/1973 | Japan . |
| 6-163040 | 6/1994 | Japan . |

*Primary Examiner*—Maria Nuzzolillo
*Assistant Examiner*—M. Wills
*Attorney, Agent, or Firm*—Evenson, McKeown, Edwards & Lenahan, P.L.L.C.

[57] ABSTRACT

This invention relates to a hydrogen absorbing electrode, in which a rare earth element having a basicity weaker than that of La is mixed to a hydrogen absorbing alloy or contained in it for serving as a component element. The invention relates to a nickel electrode, in which a rare earth element is mixed to a nickel hydroxide or contained in it as a solid solution. The invention further relates to an alkaline storage battery, in which a rare earth element is coated on a surface of a nickel electrode or a surface of a separator.

25 Claims, 29 Drawing Sheets

HYDROGEN ABSORBING ELECTRODE, NICKEL ELECTRODE AND ALKALINE STORAGE BATTERY

TECHNICAL FIELD

This invention relates to a hydrogen absorbing electrode and a nickel electrode for use in an alkaline storage battery and further to the alkaline storage battery.

BACKGROUND ART

In recent years, a nickel hydride storage battery has attracted public attention because of its high energy density and low pollution as compared with a conventional nickel-cadmium storage battery. Further, many studies and developments have been made on it for use as power sources for portable equipment and electric motor etc. In the nickel hydride storage battery, a hydrogen absorbing electrode using a hydrogen absorbing alloy, which can absorb and release hydrogen in a reversible manner, is used for a negative electrode and a nickel electrode utilizing a nickel hydroxide as an active material is used for a positive electrode.

This nickel hydride storage battery is used for a sealed-type storage battery. In this case, its negative electrode capacity is made larger than its positive electrode capacity, so that oxygen gas produced from the positive electrode at time of over-charging is consumed by the negative electrode. Thereby, a sealed system is formed.

However, when charge/discharge cycles are repeated, a gas absorbing performance and a charge efficiency at the negative electrode are reduced due to oxidation etc. of the hydrogen absorbing alloy. For this reason, there have been such problems as a rise in battery inside pressure, an increase in internal resistance due to loss of electrolyte, and a lowering of battery performance.

It is well known that a surface of the hydrogen absorbing electrode deteriorated by oxidation etc. is covered with a lot of needle-like products and these needle-like products are composed of hydroxides of rare earth elements etc. These needle-like products are produced in such a manner that rare earth element forming principal component element of the hydrogen absorbing alloy is eluted and deposited. The products grow with an increase in charge/discharge cycle number, reduce a conductivity and lessen an utilization of negative electrode capacity.

As a means for solving such a phenomenon, a method is employed now wherein corrosion resistance is improved by decreasing a quantity of La in the hydrogen absorbing alloy. This is because La is strongest in its basicity among the rare earth element forming the component element of hydrogen absorbing alloy. However, this method has included such problems as a small effect of the improvement in corrosion resistance and a decrease in discharge capacity.

On the other hand, alkaline storage batteries such as a nickel hydride storage battery, a nickel-zinc storage battery and a nickel-cadmium storage battery are frequently used under high temperature conditions because they are installed particularly in various equipments. Therefore, it is required to improve an utilization of active material under high temperature. However, a charge efficiency of the nickel electrode lowers when its temperature rises, so that the utilization of active material decreases, the electrolyte is exhausted by gas generated and a battery life is shortened.

In order to improve the utilization of active material at high temperature, such methods are generally used as [1] a method for changing a component of electrolyte, for example, a method wherein lithium hydroxide aqueous solution is added to potassium hydroxide aqueous solution, and [2] a method wherein a quantity of Co existing as a solid solution in crystal of nickel hydroxide is increased. However, the method [1] includes such problems as a reduction in the utilization of active material at low temperature and a lowering of high-rate discharge performance. And, when the quantity of Co is increased excessively, the method [2] includes such troubles as a lowering of discharge voltage and an increase in manufacturing cost.

DISCLOSURE OF THE INVENTION

A first object of this application is to provide a hydrogen absorbing electrode which can control an increase in a battery internal pressure and offer an excellent charge/discharge cycle characteristic.

A second object of this application is to provide a nickel electrode which includes a high utilization in a wide temperature region; especially in a high temperature region, and has a stabilized capacity characteristic.

A third object of this application is to provide an alkaline storage battery which includes a stabilized capacity characteristic and an excellent cycle characteristic.

A first invention of this application relates to a hydrogen absorbing electrode. In other words, the invention is characterized by that, in a hydrogen absorbing electrode using a hydrogen absorbing alloy capable of absorbing and releasing hydrogen, simple substance or compound of rare earth element which is weaker in its basicity than that of lanthanum is mixed to the hydrogen absorbing alloy.

In this invention, since the mixed rare earth element is weaker in its basicity than that of La, a protective coat under passive state which is more stable in alkaline electrolyte than La is formed on a surface of the hydrogen absorbing alloy. For this reason, elusion of the rare earth element from inside of the hydrogen absorbing alloy is controlled and the charge/discharge cycle increases. In addition, since the rare earth element is mixed, the protective coat is formed at any time even on a new alloy surface created when the hydrogen absorbing alloy cracks in connection with the charge/discharge cycle. Thereby, the above-mentioned effect is brought about preferably. According to this invention, since the corrosion resistance of electrode can be improved without changing the component element of the hydrogen absorbing alloy, the invention is favorable in terms of the alloy capacity and cost as compared with a case where the component element is changed.

In this invention, it is preferable to employ the following constructions.

(1) The rare earth element is composed at least one kind of cerium, erbium, gadolinium and ytterbium.

In this construction, Er and Yb are specially excellent in terms of the corrosion resistance. Ce is a trivalent or tetravalent metal and different in its quality from another rare earth elements in terms of a point that its form is apt to change. Therefore, when Ce is used, electrode characteristics such as a charge/discharge efficiency and a gas absorbing ability by catalytic action are improved.

(2) The compound of rare earth element is an oxide, a hydroxide or a halogenide.

In this construction, a stability and a catalytic ability are improved and the cost problem becomes advantageous too.

A second invention of this application also relates to a hydrogen absorbing electrode. In other words, the invention is characterized by that, in a hydrogen absorbing electrode using a hydrogen absorbing alloy capable of absorbing and releasing hydrogen, a rare earth element which is weaker in its basicity than that of lanthanum is contained in the hydrogen absorbing alloy as its component element.

Even in this invention, a protective coat under passive state is formed on a surface of the hydrogen absorbing alloy by the contained rare earth element, in the same way as the above first invention. Therefore, the charge/discharge cycle characteristic is improved.

In this invention, it is preferable to employ the following constructions.

(1) The rare earth element is composed at least one kind of samarium, gadolinium, terbium, dysprosium, holmium, erbium, thulium and ytterbium.

In this construction, each element of Gd, Tb, Dy, Ho, Er, Tm, Tb and Sm is effective, and especially Er and Yb are effective. A small amount of addition of each can provide an excellent corrosion resistance.

(2) The hydrogen absorbing alloy is previously subjected to a dipping treatment using alkaline aqueous solution or weak acidic aqueous solution.

In this construction, the rare earth element on the surface of hydrogen absorbing alloy is previously removed. Therefore, the rare earth element is prevented from being eluted and deposited at time of charging and discharging in the initial activation, the rare earth element is prevented from being eluted even at time of charging and discharging after the activation, so that the charge/discharge cycle characteristic is improved. Especially, when the alloy is subjected to the dipping treatment using a weak acidic solution or buffer solution, an excellent capacity can be provided from an initial stage.

A third invention of this application also relates to a nickel electrode. The invention is characterized by that, in a nickel electrode using a nickel hydroxide as its active material, simple substance or compound of the rare earth element is mixed to the active material.

In this invention, Yb or Yb compound for example, is deposited as a stable hydroxide in a strong alkali. This hydroxide raises an oxygen evolution overvoltage to offer an effect for preventing decomposition of the electrolyte, so that the charge efficiency of nickel electrode at high temperature is improved. In addition, this hydroxide forms the protective coat under passive state on the surface of the hydrogen absorbing alloy, even in case of the hydrogen absorbing electrode. Therefore, the elusion of rare earth element from the inside of hydrogen absorbing alloy is controlled. Accordingly, the hydrogen absorbing alloy is prevented from being corroded and a service life of the hydrogen absorbing electrode forming the negative electrode is prolonged.

In this invention, it is preferable to employ the following construction.

(1) The rare earth element is composed of ytterbium.

(2) The simple substance or compound of rare earth element exists under a state free from the active material.

According to this construction, the characteristics of rare earth element are maintained and conveniency of manufacture is improved.

(3) The compound of rare earth element is composed of an oxide, a hydroxide or a halogenide.

In this construction, a stability in alkaline and a catalytic ability are improved and the cost problem becomes advantageous too.

(4) At least one kind of cobalt, zinc, cadmium and magnesium is contained in the nickel hydroxide as a solid solution. The rare earth element is composed at least one kind of yttrium, holmium, erbium, thulium, ytterbium, europium and lutetium.

In this construction, it is intended to prolong the service life of battery by adding Cd, Zn or Mg to the nickel hydroxide as a solid solution. In addition, it is intended to improve the charge efficiency by adding Co as a solid solution, and to further improve the charge efficiency especially at high temperature by adding the mixed rare earth element. Namely, when Cd, Zn or Mg is added into the nickel hydroxide as a solid solution, an electrode swelling can be controlled. Accordingly, a phenomenon wherein the electrolyte in a separator is exhausted due to a pressure on the separator caused by the electrode swelling, is controlled so that the battery service life can be prolonged.

A potential difference ($\eta$ value) between an oxidation potential and an oxygen evolution potential of the nickel hydroxide correlates with the charge efficiency, and the charge efficiency has a tendency to become large with an increase in the $\eta$ value. Since the oxidation potential of the nickel hydroxide shifts to a base side when Co is added as a solid solution to the nickel hydroxide, the $\eta$ value is increased and the charge efficiency at high temperature is improved.

On the other hand; Y, Ho, Er, Tm, Yb and Lu etc. have an effect to shift the oxygen evolution potential to a more noble potential. Accordingly, the charge efficiency is improved further when these rare earth elements are added. This effect owes to a synergetic action between Co and the rare earth elements. The foregoing rare earth elements have an effect to considerably increase the charge efficiency at high temperature as compared with La and Ce etc. Especially this effect is remarkable in Yb oxide, Er oxide and mixed rare earth element oxide containing Yb etc. Even when the solid solution element is Cd, Zn or Mg, the charge efficiency improving effect is brought about by the foregoing rare earth elements.

In the foregoing invention (4), it is preferable to set an internal pore volume of the nickel hydroxide to a value smaller than or equal to 0.1 ml/g. By using such a high-density nickel hydroxide, the high-rate discharge characteristic is improved and the nickel electrode stable at high temperature and having a large capacity can be obtained.

A fourth invention of this application also relates to a nickel electrode. The invention is characterized by that, in a nickel electrode using a nickel hydroxide as its active material, a rare earth element is contained in the nickel hydroxide as a solid solution.

According to this invention, since the oxygen overvoltage is raised to an appropriate value, a lowering of the charge efficiency at high temperature can be controlled without lowering a discharge potential.

In this invention, it is preferable to employ the following construction.

(1) At least one of cobalt and zinc is also contained as a solid solution to the nickel hydroxide.

In this construction, in addition to the foregoing effect offered by the rare earth element, such effects are brought about that a charge reaction potential at high temperature becomes improved without lowering a discharge potential, a conductivity in nickel hydroxide particles is improved, and an utilization is improved, when the rare earth element and Co are contained in the nickel hydroxide as a solid solution.

In addition to the foregoing effect offered by the rare earth element, crystal structure of the nickel hydroxide are deformed to improve an utilization of the active material and an electrode swelling due to formation of $\gamma$-NiOOH is controlled, when the rare earth element and Zn are contained in the nickel hydroxide as solid solutions.

The foregoing effects are brought about in a combined manner when the rare earth element and Co and Zn are included in solid solution state.

(2) The rare earth element is composed at least one kind of ytterbium, europium, yttrium, holmium, lutetium, thulium, and erbium.

(3) The active material has a component shown by the following equation. (In the equation, X is composed at least one kind of ytterbium, europium, lutetium and erbium; and a=b+c+d, $0.02 \leq a \leq 0.20$, $0 \leq c < 0.20$, $0 \leq d < 0.20$).

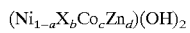

$$(Ni_{1-a}X_bCo_cZn_d)(OH)_2$$

A fifth invention of this application also relates to a nickel electrode. The invention is characterized by that, in a nickel electrode using a nickel hydroxide as its active material, the active material is mixed with a cobalt compound and simple substance or compound of at least one kind of rare earth element group comprising yttrium, holmium, erbium, thulium, ytterbium, and lutetium.

In this invention, an oxygen evolution potential at the end of charge remarkably shifts to a noble side when Y, Ho, Er, Tm, Yb and Lu are added to the nickel hydroxide. FIG. 1 shows the η value of the nickel electrode at 20° C. when oxide powder of rare earth element is added in equal mole quantity. Incidentally, the η value means a potential difference between the oxidation potential and the oxygen evolution potential. For example, when the nickel hydroxide is charged at a high temperature higher than 40° C., the η value becomes small to lower the charge efficiency. However, when Y, Ho, Er, Tm, Yb and Lu etc. are added, the η value becomes large effectively to control occurrence of competitive reaction and improve the charge efficiency.

While, the utilization of active material is improved because a conductive network composed mainly of cobalt oxyhydroxide is formed on surfaces of nickel hydroxide particles, pore insides and surfaces of electrode substrate etc., by means of the added cobalt compound. In this case, the cobalt oxyhydroxide is obtained by oxidizing cobalt monoxide, α cobalt hydroxide, β cobalt hydroxide and metallic cobalt etc. in alkaline solution.

In this invention, it is preferable to employ the following constructions.

(1) At least ytterbium and lutetium were selected from the rare earth element group.

Especially, Yb and Lu offer foregoing effects conspicuously.

(2) Two or more kinds of elements were selected from the rare earth element group, and used under mixed state or as a composite compound.

When these elements are used under mixed state, the most appropriate effect can be brought about. A kind of composite compound, or a composite compound having Yb and Lu as its principal component, for example, is inexpensive because it is formed as an eutectoid when separating and forming the rare earth element from ore.

(3) In the two or more kinds of selected rare earth elements, contents of ytterbium and lutetium are larger than or equal to 35 wt % when converted to an amount of oxide, and a ratio of the content of yttribium to the contents of ytterbium and lutetium is larger than or equal to 0.75 when converted to an amount of oxide.

(4) The cobalt compound is composed at least one kind of cobalt oxyhydroxide, cobalt monoxide, α cobalt hydroxide, β cobalt hydroxide and metallic cobalt.

(5) In the selected cobalt compound, a percentage of metallic cobalt is smaller than or equal to 3 wt %.

When the metallic cobalt is added, a thickness of conductive layer comprising the cobalt oxyhydroxide increases electrochemically and a conductivity of not-reacting metallic cobalt is added. For this reason, a high-rate discharge characteristic is further improved. However, in order to reduce a charge reserve quantity in a sealed-type battery and to control an increase in the cost, it is desirable to set the amount of metallic cobalt to a value smaller than or equal to 3 wt % in relation to the total amount of cobalt compound.

A sixth invention of this application relates to an alkaline storage battery. This invention is characterized by that, in an alkaline storage battery equipped with a nickel electrode using a nickel hydroxide for its active material, a negative electrode, a separator and an alkali electrolyte; simple substance or compound of rare earth element is coated on a surface of the nickel electrode.

In this invention, simple substance or compound of Yb, for example, is deposited as a stable hydroxide in the alkali aqueous solution. This hydroxide has an effect to raise the oxygen overvoltage at high temperature, so that the evolution of oxygen from the positive electrode side at final stage of charging is controlled and the utilization at high temperature is improved. Further, the rare earth element is slightly eluded into the electrolyte and deposited on a surface of the hydrogen absorbing alloy as a stable hydroxide to form a protective coat. For this reason, dissolution of the rare earth element in the hydrogen absorbing alloy is controlled, so that the alloy is prevented from being corroded and the battery service life is prolonged.

By the way, the dissolution control effect owing to the rare earth element such as Yb, etc. is also brought about on the cobalt compound. Therefore, formation of $HCoO_2^-$ ion due to the dissolution of cobalt compound is controlled. In such a case, the conductive network between active materials owing to CoOOH formed by the first cycle charging is formed insufficiently, so that the utilization is reduced and the high-rate discharge characteristic performance is impaired. However, since the rare earth element is coated on the surface of nickel electrode in this invention, the rare earth element is located apart from the cobalt compound. Accordingly, there is no chance for the cobalt compound in the electrode to be controlled in its dissolution, so that the conductive network is formed securely.

A seventh invention of this application also relates to an alkaline storage battery. This invention is characterized by that, in an alkaline storage battery equipped with a nickel electrode using a nickel hydroxide as its active material, a negative electrode, a separator and an alkali electrolyte; simple substance or compound of rare earth element is coated on a surface of the separator.

Also in this invention, the utilization at high temperature is improved, the hydrogen absorbing alloy is prevented from being corroded, and the conductive network is formed securely, in the same way as the foregoing sixth invention. In addition, since a net charge quantity of the nickel hydroxide in the nickel electrode does not decrease in this invention, there is no chance for the battery capacity or energy density to decrease.

In this invention, the rare earth element is coated at least on a positive electrode side face of the separator. Thereby, the oxygen overvoltage of the nickel hydroxide is raised positively and the utilization at high temperature is improved securely.

In the foregoing sixth and seventh inventions, a weight percentage of coating is preferably set to 0.1 wt %~10 wt % of an amount of positive electrode active material. The effect to raise the oxygen overvoltage can not be obtained when the percentage is smaller than 0.1 wt %. When the percentage is larger than 10 wt %, the dissolution control effect becomes too large, so that disadvantages will arise such as a faulty formation of the conductive network and a delay of activation of the hydrogen absorbing alloy of the negative electrode.

An eighth invention of this application also relates to an alkaline storage battery. This invention is characterized by that, in an alkaline storage battery equipped with a nickel electrode using a nickel hydroxide as its active material, a negative electrode, a separator and an alkali electrolyte; simple substance or compound of rare earth element is dissolved in the alkali electrolyte.

Also in this invention, the utilization at high temperature is improved, the hydrogen absorbing alloy is prevented from being corroded, and the conductive network is formed securely, in the same way as the foregoing sixth invention.

In this invention, it is desirable that the alkali electrolyte has a principal component of potassium hydroxide and contains sodium hydroxide or lithium hydroxide. Thereby, the high temperature characteristic is improved. Conventionally, in case of the sodium hydroxide contained, there has been such a problem that its content has been restricted in order to prevent the electrolyte from becoming viscous. In case of the lithium hydroxide contained, there has been such a problem that a lithium ion concentration in the electrolyte has been reduced with a progress of the charge/discharge cycle. In this invention, however, such problems can be solved because the rare earth elements are dissolved in the electrolyte.

In the above-mentioned sixth, seventh and eighth inventions, it is preferable to employ the following constructions.

(1) The rare earth element is composed of ytterbium.
(2) The compound of rare earth element is composed of oxide, hydroxide or halogenide.

BEST MODE FOR CARRYING OUT THE INVENTION

EXAMPLE 1

This example relates to a hydrogen absorbing electrode.
[Making-up of Electrode]

A commercially available Mm (misch metal), which is a composite of rare earth elements of La, Ce, Pr & Nd etc., and Ni, Al, Co & Mn were weighed for specified quantities. An alloy having a component of $MmNi_{3.8}Al_{0.3}Co_{0.7}Mn_{0.2}$ was made up using a high-frequency melting furnace under an inert atmosphere. This is named as an alloy X.

The alloy X was mechanically ground, and the resulting powder was sufficiently mixed with 0.5 wt % of $CeO_2$ powder using a mortar and added with a thickener so as to be formed into a paste. This paste was filled in a nickel fiber substrate, dries and pressed so as to make up a hydrogen absorbing electrode. This is named as an example electrode 1A.

On the other hand, example electrodes 1B, 1C & 1D were made up in the same procedures as those of the example electrode 1A except that $Gd_2O_3$, $Er_2O_3$ and $Yb_2O_3$ were used in place of the $CeO_2$.

Further, a comparison electrode 1a was made up without mixing the rare earth element such as $CeO_2$, that is; by using the alloy X only, in the same procedures as those of the example electrode 1A.

[Making-up of Battery]

Utilizing the foregoing electrodes for serving as negative electrodes, paste-type nickel electrodes, which used high-density nickel hydroxide powder as active material, for serving as positive electrodes, and potassium hydroxide aqueous solution having a specific gravity of 1.28 for serving as an electrolyte; sealed nickel hydride storage batteries of AA-size with nominal capacity of 1,100 mAh were made up. The batteries thus made up were named as example batteries 1A, 1B, 1C & 1D and a comparison battery 1a in correspondence with the example electrodes 1A, 1B, 1C & 1D and the comparison electrode 1a.

[Test]

Charge/discharge cycle tests were done on the foregoing batteries. The charging was done for three hours using a current of 0.5 CmA, and the discharging was done down to 1.0 V using a current of 0.5 CmA. A resting time between the charging and discharging was one hour.

Figure 1:
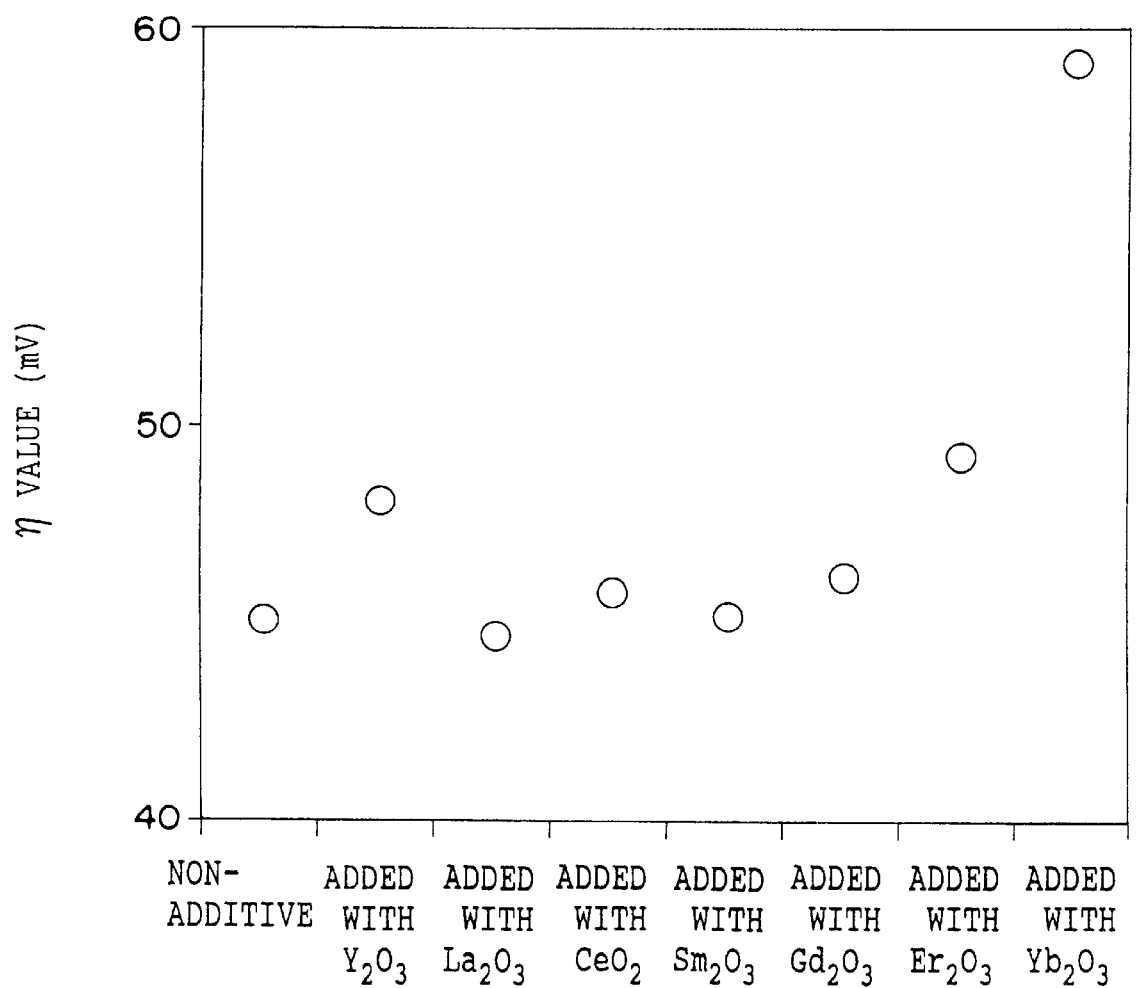
FIG. 1 is a graph showing the η value at 20° C. of the nickel electrode when the oxide powders of rare earth elements are added in the same mole quantity in relation to the fifth invention of this application.
Figure 2:
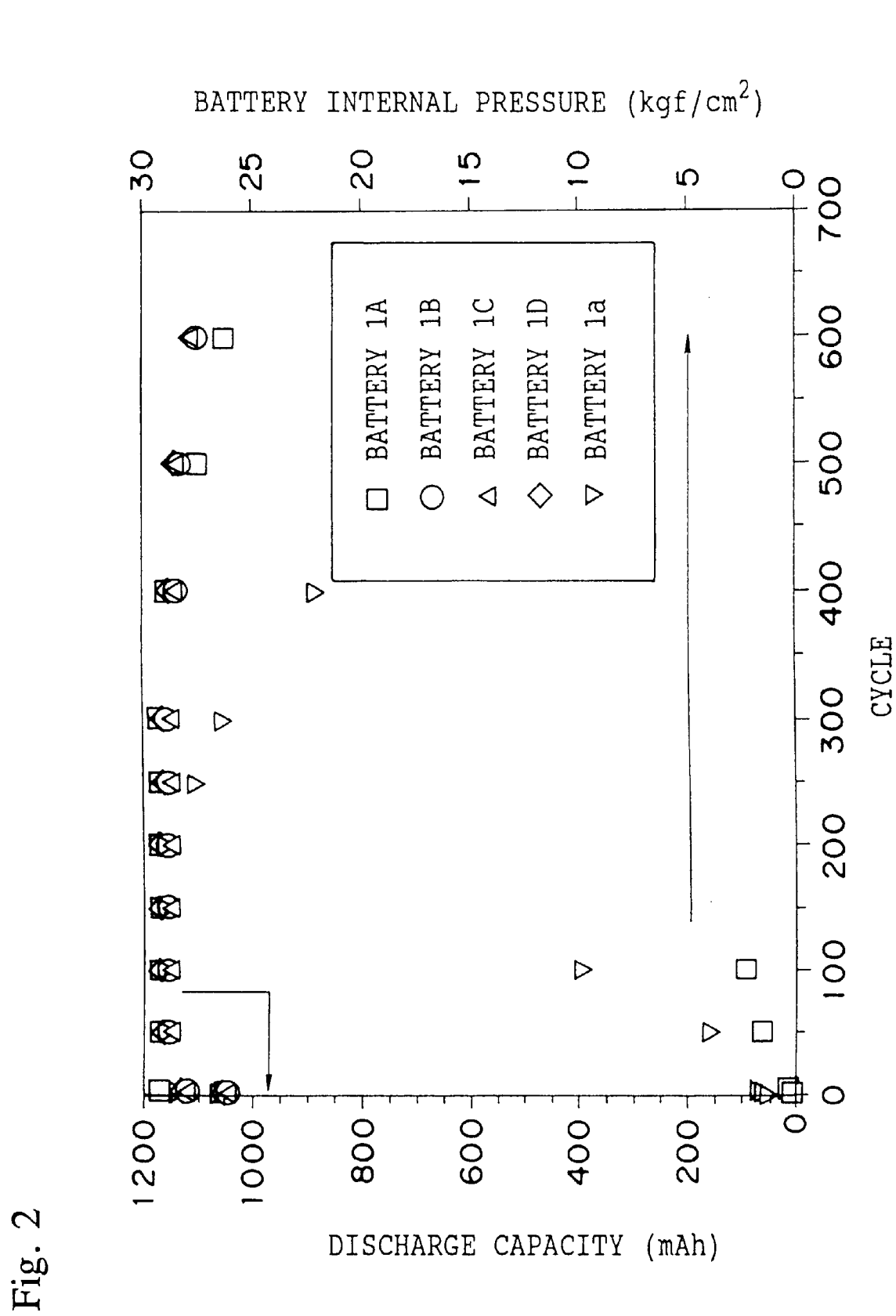
FIG. 2 is a graph showing relations of the discharge capacity and the battery internal pressure with the cycle for batteries of example 1.

FIG. 2 is the graph showing relations of the discharge capacity and the battery internal pressure with the cycle. As obvious from FIG. 2, the example batteries 1A, 1B, 1C & 1D are excellent in the charge/discharge characteristic as compared with the comparison battery 1a. Further, these batteries were remarkably improved in terms of the battery internal pressure, too. Especially, the example batteries 1C & 1D were excellent in this respect. The example battery 1A was specially excellent in the battery internal pressure characteristic and battery voltage characteristic.

The foregoing batteries were disassembled, the hydrogen absorbing alloys were taken out of the electrodes after being subjected to the charge/discharge cycles, and the X-ray diffractions of them were measured. Comparing peaks of rare earth element hydroxides in the measured results, it was found that the example electrodes 1A, 1B, 1C & 1D produced small quantities of formed hydroxides and controlled in terms of occurrence of alloy corrosion as compared with the comparison electrode 1a. As the results, the decrease in charge reserve quantity caused by alloy corrosion is avoided and the battery internal pressure rise due to produced hydrogen is controlled.

As mentioned above, according to the hydrogen absorbing electrode of this example, the battery internal pressure rise can be controlled and the excellent charge/discharge cycle characteristic can be brought about.

The rare earth elements such as Ce etc. are used for serving as the oxides in the foregoing example, however, these elements may be used as hydroxides and halogenides. Even in this case, the same effect will be brought about.

It is permitted for the rare earth elements to exist in grain boundaries of the hydrogen absorbing alloy particles and on surfaces of the alloy particles.

EXAMPLE 2

This example relates to a hydrogen absorbing electrode.

[Making-up of Electrode]

An hydrogen absorbing alloy having a component of $MmNi_{3.6}Al_{0.3}Co_{0.75}Mn_{0.35}$ was ground, by using a ball mill, to make powder having a grain size of 50 $\mu$m. The powder was sufficiently mixed with 0.5 wt % of Er oxide, added with 0.5 wt % of methyl cellulose aqueous solution as a thickener, and adjusted its viscosity so as to be formed into paste-like liquid. This viscous liquid was filled in a fibrous nickel porous substrate, dried and pressed to a specified thickness. Thus, a hydrogen absorbing electrode was made up. This is named as an example electrode 2A.

An example electrode 2B was made up in the same procedures as those of the example 2A except that Yb oxide was used in place of the Er oxide.

On the other hand, a comparison electrode 2a was made up in the same procedures as those of the example electrode 2A except that the rare earth element oxide was not mixed.

[Making-up of Battery]

Utilizing the foregoing electrodes for serving as negative electrodes, nickel electrodes having larger capacities that those for serving as positive electrodes, separators comprising polypropylene non-woven cloths, and alkali aqueous solution; nickel hydride storage batteries controlled in terms of the negative electrode capacities, were made up. These batteries thus made up were named as example batteries 2A & 2B and a comparison battery 2a in correspondence with the example electrodes 2A & 2B and the comparison electrode 2a.

[Test]

Charge/discharge cycle characteristics were examined on the foregoing batteries. The charging was done for five hours using a current of 0.3 C, and the discharging was done down to 1.0V using a current corresponding to 1C, repeatedly. Thus, elapses of negative electrode capacities were checked.

Figure 3:
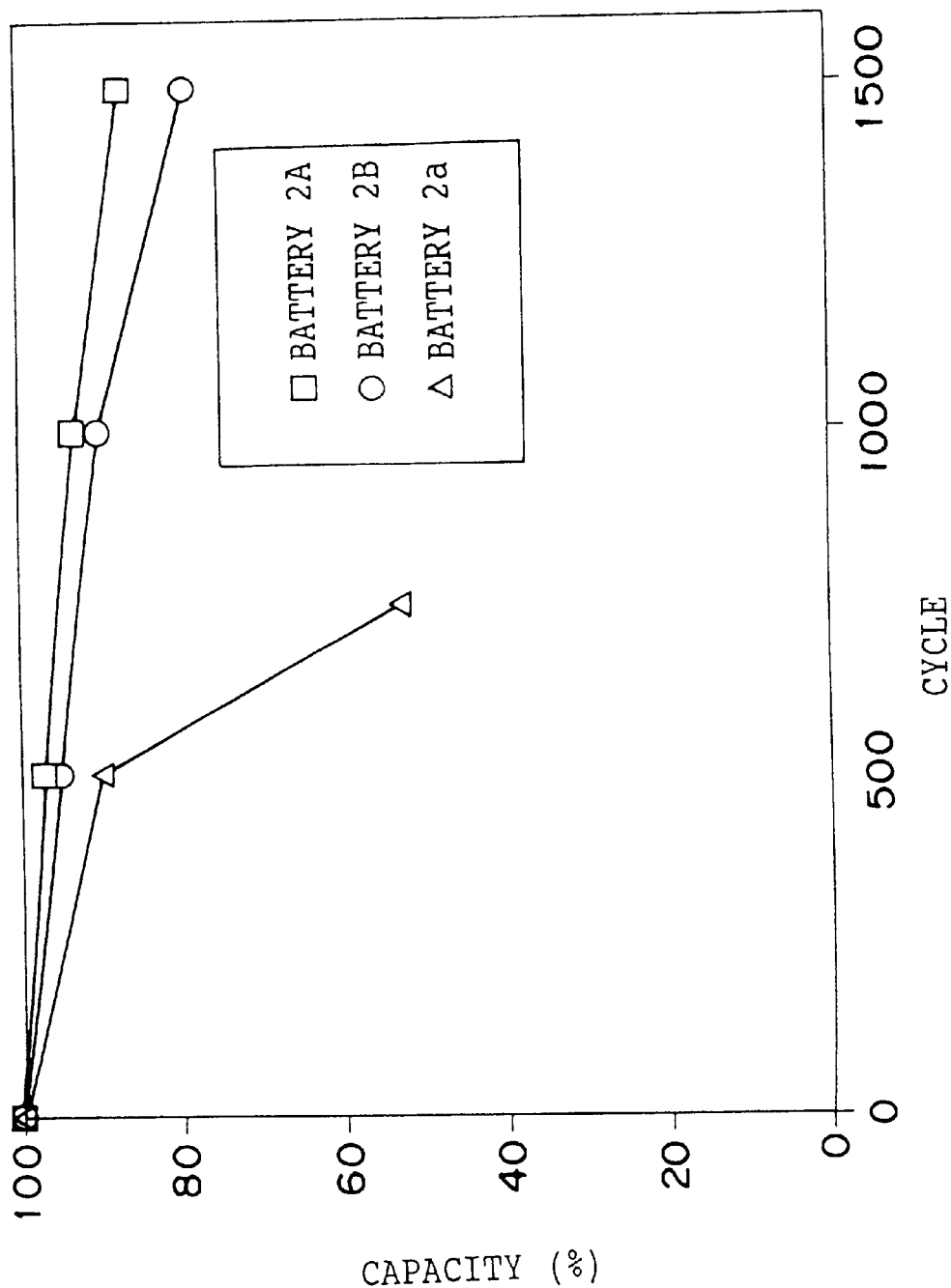
FIG. 3 is a graph showing the charge/discharge cycle characteristic for batteries of example 2.

FIG. 3 is the graph showing the elapse of capacity on every cycle with reference to the first cycle capacity as 100. As obvious from FIG. 3, the example batteries 2A & 2B were remarkably improved in terms of the charge/discharge cycle characteristics.

As mentioned above, according to the hydrogen absorbing electrode of this example, the battery internal pressure rise can be controlled and the excellent charge/discharge cycle characteristic can be brought about.

The rare earth elements such as Er etc. are used for the oxides in the foregoing example, however, these elements may be used for the hydroxides and halogenides. Even in this case, the same effect will be brought about.

EXAMPLE 3

This example relates to a hydrogen absorbing electrode.

[Making-up of Electrode]

An alloy X having a component of $MmNi_{3.8}Al_{0.3}Co_{0.7}Mn_{0.2}$ was made up in the same procedures as those of the example 1.

On the other hand, an alloy 3A was made up in the same procedures as those of the alloy X except that Sm was added to the component of the alloy X so as to obtain a weight ratio of Mm to Sm as 95:5. The percentages of Ni, Al, Co and Mn were the same as those of the alloy X.

In the same way, an alloy 3B was made up in the same procedures as those of the alloy 3A except that Gd was used in place of Sm.

In the same way, an alloy 3C was made up in the same procedures as those of the alloy 3A except that Er was used in place of Sm.

In the same way, an alloy 3D was made up in the same procedures as those of the alloy 3A except that Yb was used in place of Sm.

The foregoing alloys were mechanically ground, and the resulting alloy powders were added with a thickener so as to be formed into pastes. These pastes were filled in nickel fiber substrates, dried and pressed so as to make up hydrogen absorbing electrodes. The electrodes thus made up were named as example electrodes 3A, 3B, 3C & 3D and an comparison electrode 3a in correspondence with the alloys 3A, 3B, 3C & 3D and the alloy X.

[Making-up of Battery]

Utilizing the foregoing electrodes, batteries were made up in the same procedures as those of the example 1. These batteries thus made up were named as example batteries 3A, 3B, 3C & 3D and a comparison battery 3a in correspondence with the example electrodes 3A, 3B, 3C & 3D and the comparison electrode 3a.

[Test]

Tests same as those of the example 1 were done.

Figure 4:
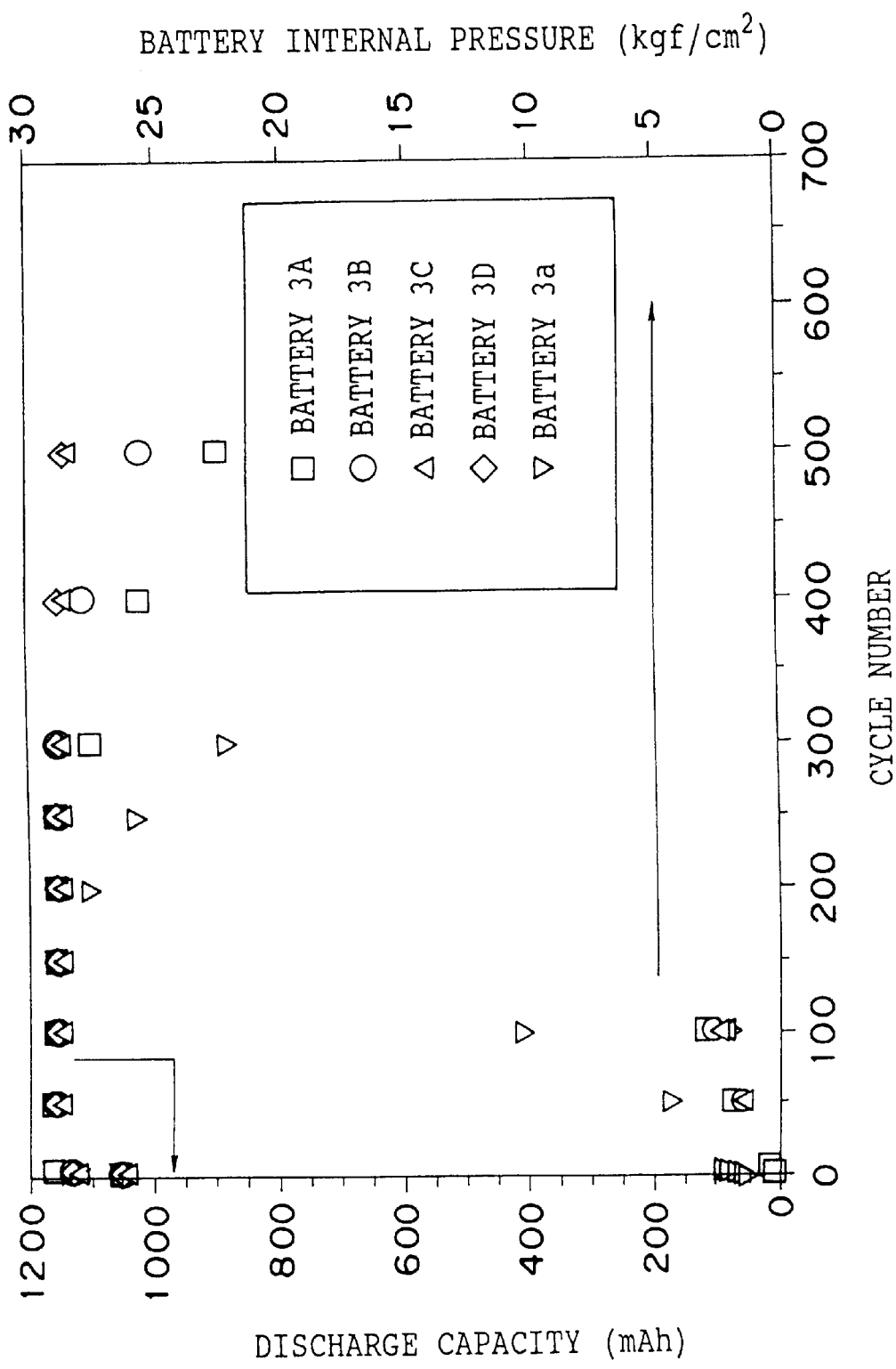
FIG. 4 is a graph showing relations of the discharge capacity and the battery internal pressure with the cycle for batteries of example 3.

FIG. 4 is the graph showing relations of the discharge capacity and the battery internal pressure with the cycle. As obvious from FIG. 4, the example batteries 3A, 3B, 3C & 3D are excellent in terms of the charge/discharge characteristic as compared with the comparison battery 3a. Further, these batteries were remarkably improved in terms of the battery internal pressure, too.

The foregoing batteries were disassembled, the hydrogen absorbing alloys were taken out of the electrodes after being subjected to the charge/discharge cycles, and the X-ray diffractions of them were measured. Comparing peaks of rare earth element hydroxides in the measured results, it was found that the example electrodes 3A, 3B, 3C & 3D produced small quantities of formed hydroxides and controlled in terms of occurrence of alloy corrosion, as compared with the comparison electrode 3a.

As mentioned above, according to the hydrogen absorbing electrodes of this example, the battery internal pressure rise can be controlled and the excellent charge/discharge cycle characteristic can be brought about.

EXAMPLE 4

This example relates to a hydrogen absorbing electrode.

[Making-up of Electrode]

The alloy 3D made up in the example 3 was mechanically ground to obtain alloy powder, and this alloy powder was dipped and stirred in high-temperature alkali aqueous solution formed by mixing KOH with LiOH. Then, it was rinsed and dried. In this instance, the alkali aqueous solution was identical with that used for an electrolyte. Thereafter, the alloy powder after being dried was added with a thickener to be formed into a paste. It was then filled in a nickel fiber substrate, dried and pressed so that a hydrogen absorbing electrode was made up. This is named as an example electrode 4A.

An example electrode 4B was made up in the same procedures as those of the example electrode 4A except that acetic-acid/sodium-acetate buffer solution adjusted its pH to 3.6 was used in place of the high-temperature alkali aqueous solution.

A comparison electrode 4a was made up in the same procedures as those of the example electrode 4A except that the dipping treatment was not done.

[Test of Electrode]

Figure 5:
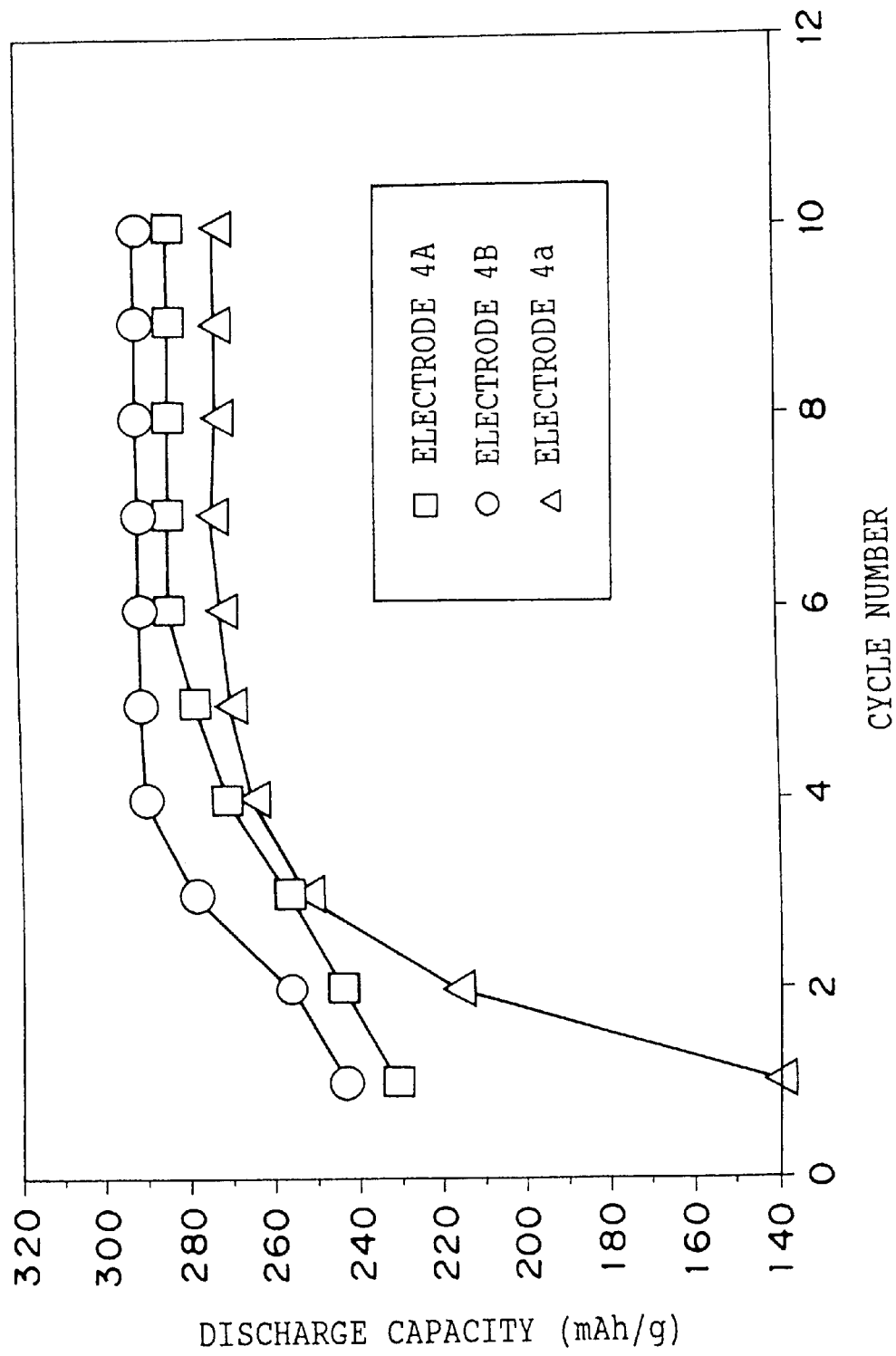
FIG. 5 is a graph showing relations between the cycle number and the discharge capacity for electrodes of example 4.

Utilizing the above-mentioned electrodes, charging and discharging were carried out by using ordinary nickel electrodes as their counter electrodes. FIG. 5 shows these results. As obvious from FIG. 5, initial activations of the example electrodes 4A and 4B were quickly done, especially that of the example electrode 4B was quickly done, so that their capacities were large.

[Making-up of Battery]

Utilizing the foregoing electrodes, batteries were made up in the same procedures as those of the example 1. These batteries thus made up were named as example batteries 4A & 4B and a comparison battery 4a in correspondence with the example electrodes 4A & 4B and the comparison electrode 4a.

[Test]

Tests same as those of the example 1 were done.

Figure 6:
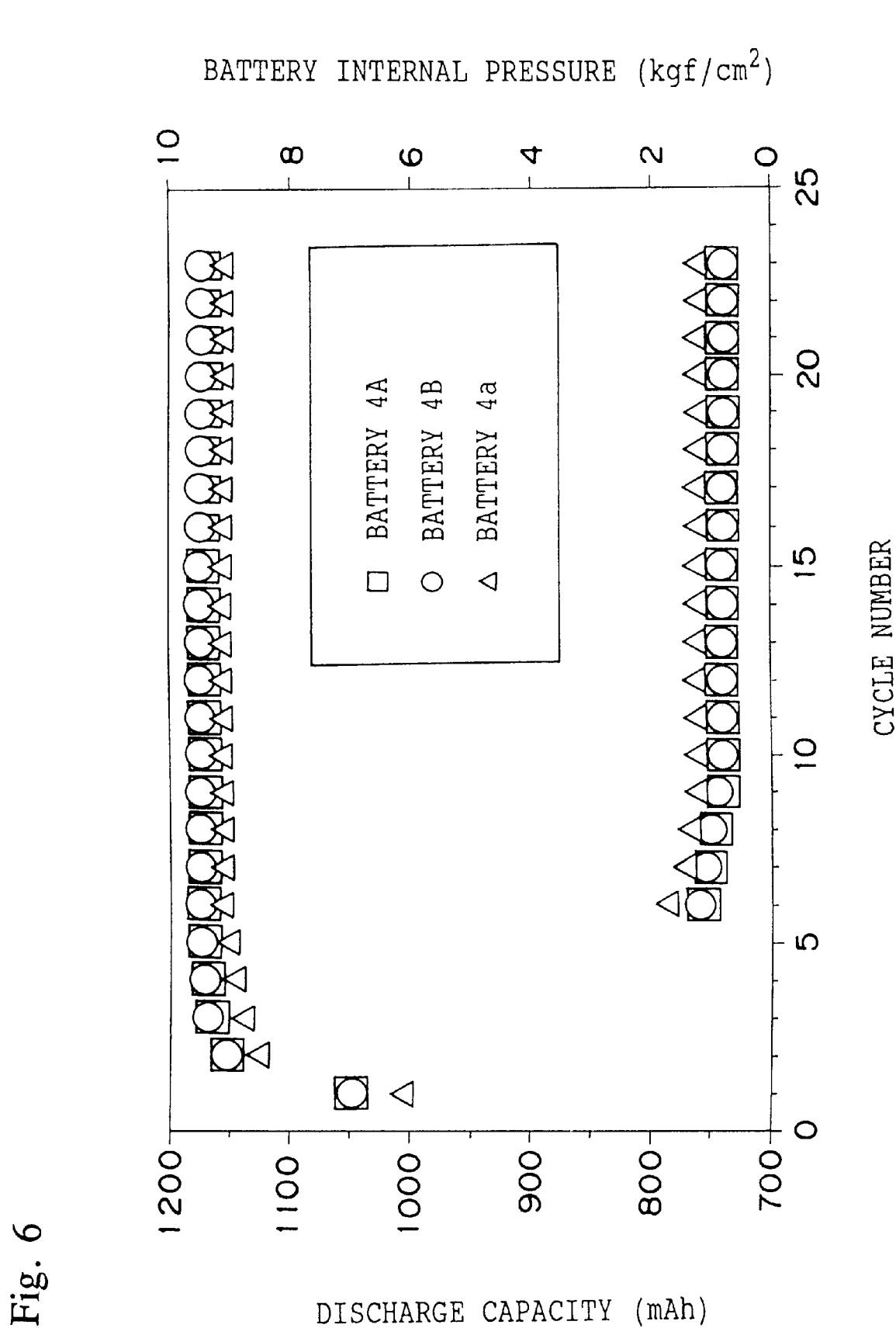
FIG. 6 is a graph showing relations of the discharge capacity and the battery internal pressure with the cycle for batteries of example 4.

FIG. 6 is the graph showing relations of the discharge capacity and the battery internal pressure with the cycle. As obvious from FIG. 6, the example batteries 4A & 4B are excellent in terms of characteristics of the discharge capacity of the charge/discharge cycle and the battery internal pressure, as compared with the comparison battery 4a. In FIG. 6, the discharge capacities are plotted at upper side and the battery internal pressures are plotted at lower side.

As mentioned above, according to the hydrogen absorbing electrodes of this example, the battery internal pressure can be controlled and the excellent charge/discharge cycle characteristic can be obtained. Further, excellent capacity characteristic can be obtained from an initial stage.

EXAMPLE 5

This example relates to a nickel electrode.

[Making-up of Electrode]

Commercially available nickel hydroxide powder not containing cadmium was added with 6 wt % of metallic Co powder and 4 wt % of CoO powder for serving as a conductive agent, and further added with 2.5 wt % of $Yb_2O_3$ powder. Then, they were sufficiently mixed and added with water and a thickener to be formed into a paste. The paste was filled in a nickel fiber substrate, dried and pressed, so as to make up a nickel electrode. This is named as an example electrode 5A.

A comparison electrode 5a was made up in the same procedures as those of the example electrode 5A except that $Ca(OH)_2$ was added in place of $Yb_2O_3$.

Further, a comparison electrode 5b was made up in the same procedures as those of the example electrode 5A except that no compound was added in place of $Yb_2O_3$.

[Making-up of Battery]

Utilizing the foregoing electrodes for serving as positive electrodes and ordinary hydrogen absorbing electrodes for serving as negative electrodes, and using an alkali electrolyte; nickel hydride storage batteries were made up. The batteries thus made up are named as an example battery 5A and comparison batteries 5a & 5b in correspondence with the example electrode 5A and the comparison electrodes 5a & 5b.

[Test]

Figure 7:
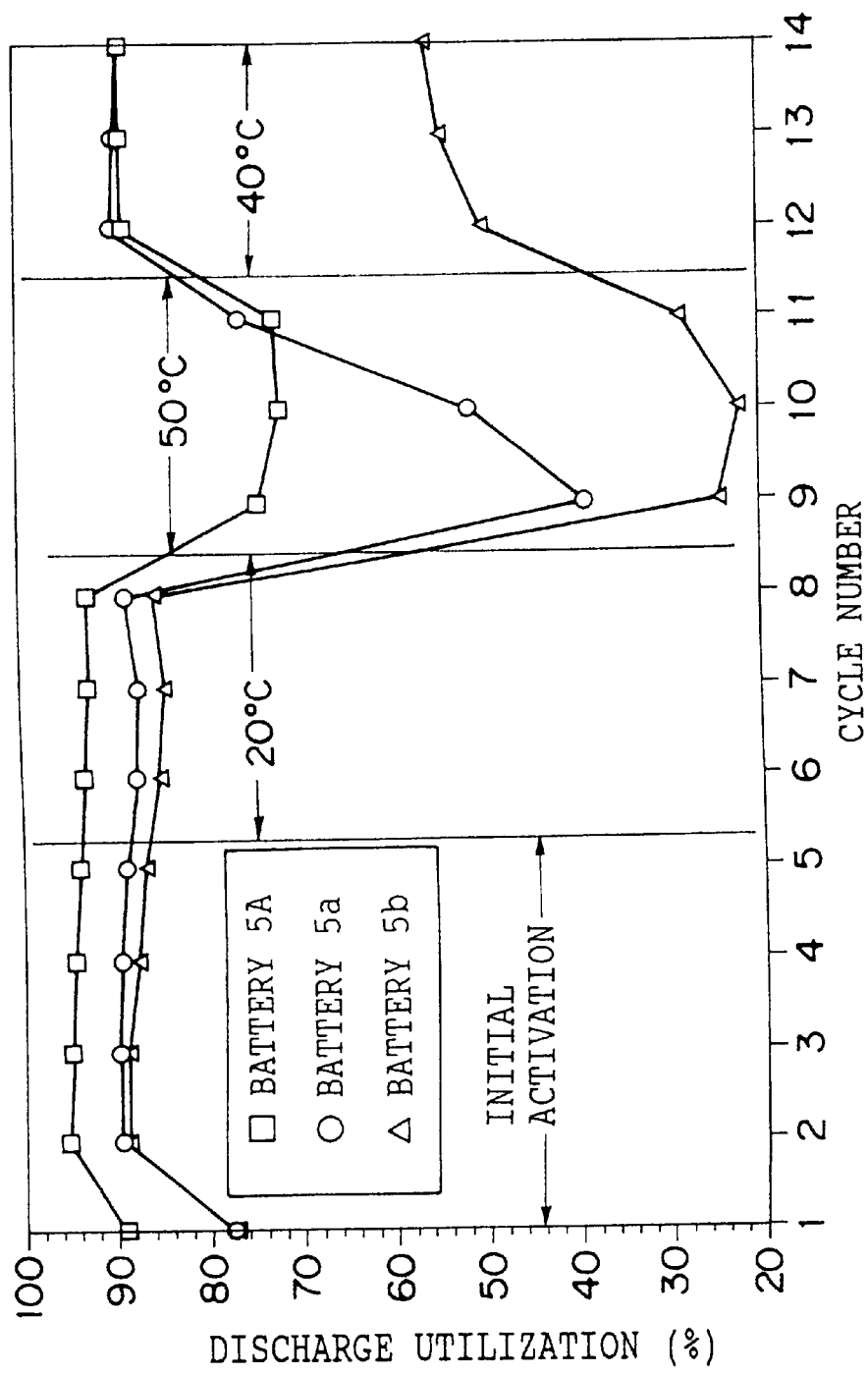
FIG. 7 is a graph showing relations between the cycle number and the discharge utilization for batteries of example 5.

Charge/discharge cycle tests were done on the foregoing batteries. FIG. 7 shows these results. Table 1 shows the potential difference ($\eta$ value) between the oxygen evolution potential and oxidation potential of battery.

[TABLE 1]

| battery | $\eta$ value |
| --- | --- |
| 5A | 60 mV |
| 5a | 53 mV |
| 5b | 51 mV |

The discharge utilization of FIG. 7 is calculated as follows. A practical discharge capacity at time when a theoretical capacity of $Ni(OH)_2$ in a positive electrode composite is assumed as 290 mAh per one gram, is divided by the theoretical capacity and multiplied by 100. As obvious from FIG. 7, the example battery 5A maintains a sufficient capacity even at a high temperature. Further, as obvious from Table 1, the $\eta$ value of the example battery 5A is larger than those of the comparison batteries 5a & 5b. Thereby, decomposition of the electrolyte is controlled to prevent the battery capacity from being reduced.

Figure 8:
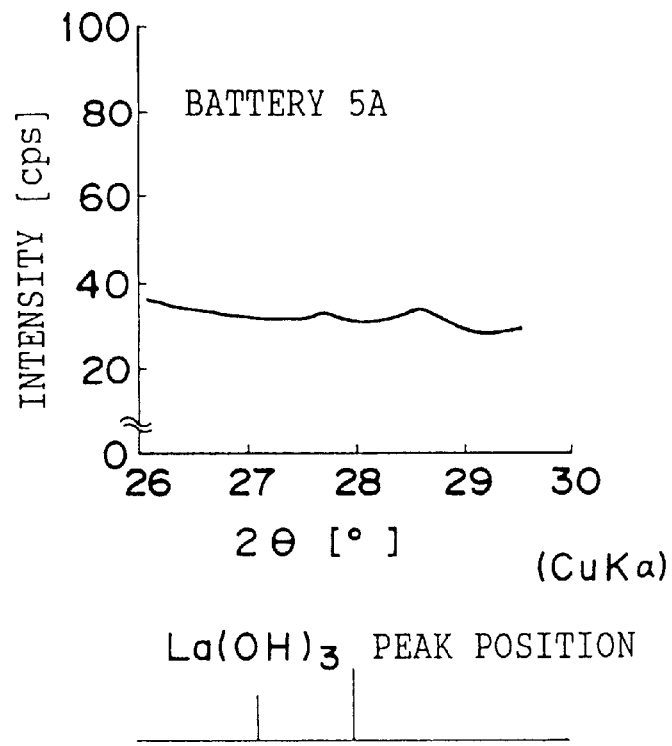
FIG. 8 through FIG. 10 are graphs showing results of X-ray diffraction measurements for hydrogen absorbing alloys of negative electrodes of example 5.
Figure 9:
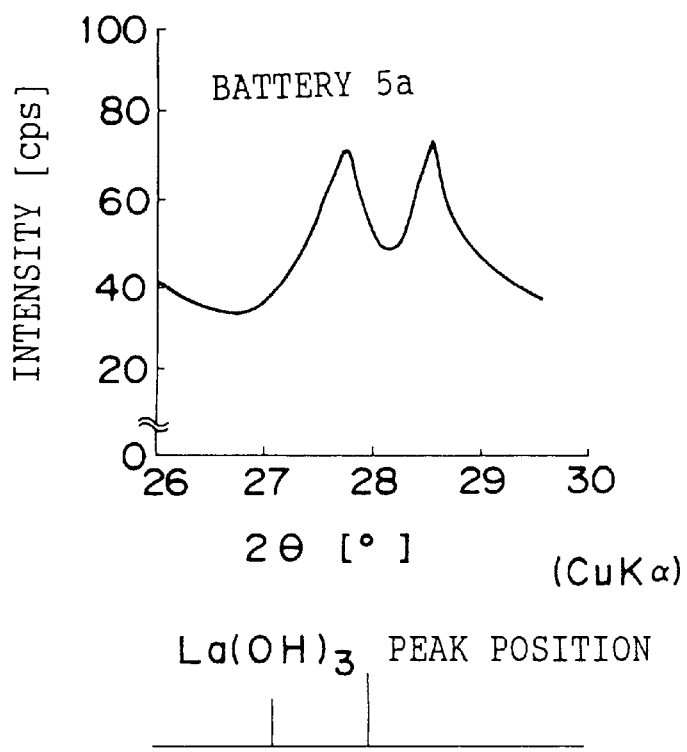
Figure 10:
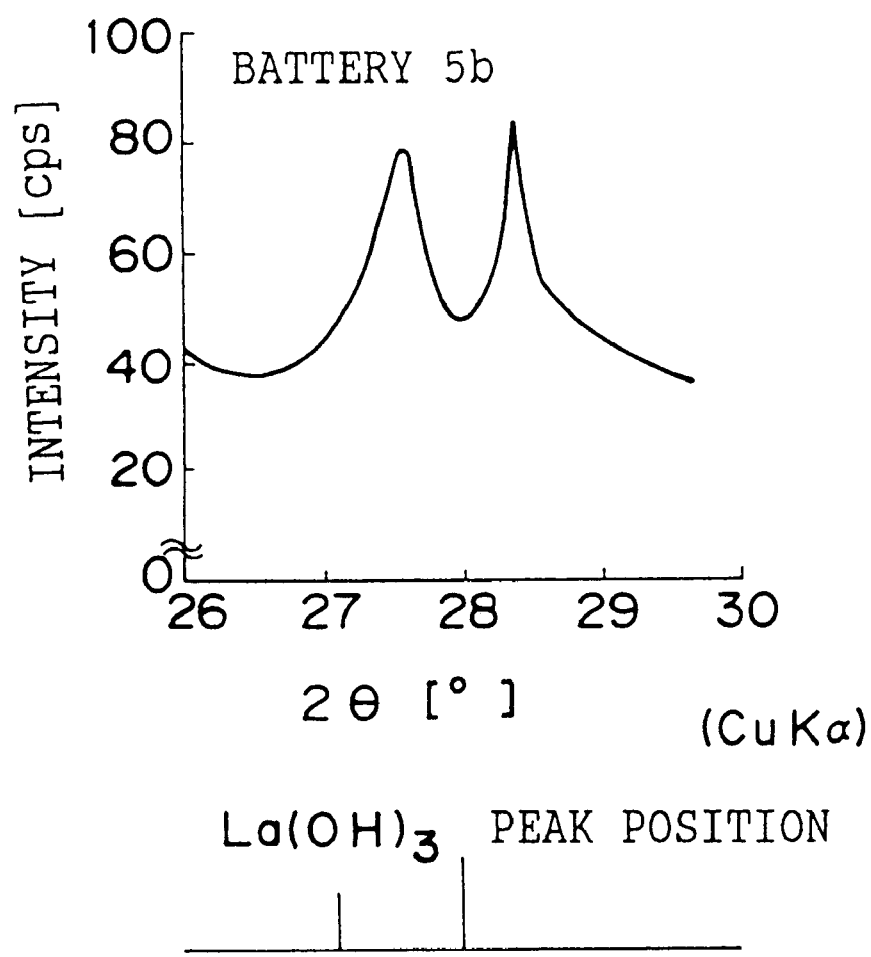

Further, the batteries after being subjected to the charge/discharge cycle tests were disassembled, the hydrogen absorbing alloys were taken out of the electrodes, and X-ray diffractions of them were measured. Results of them are shown in FIG. 8 through FIG. 10. As obvious from these figures, in the example battery 5A, peaks of the rare earth element hydroxides in the vicinity of 2θ=27°~29° are small so that the corrosion of alloy is controlled.

As mentioned above, according to the nickel electrodes of this example, the utilization of nickel electrode at high temperature can be increases and a service life of the hydrogen absorbing electrode can be prolonged when used for the nickel hydride storage battery.

EXAMPLE 6

Figure 11:
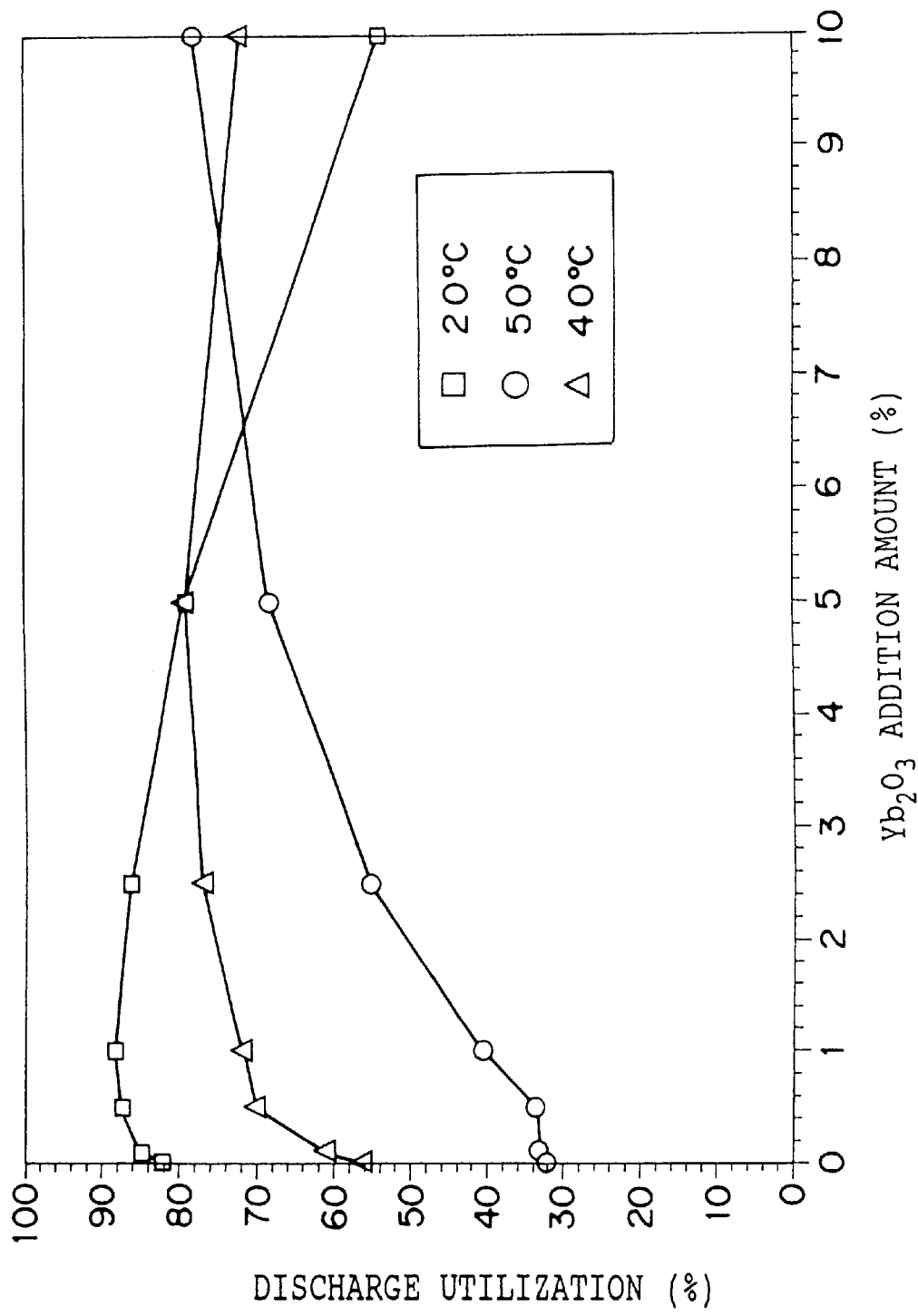
FIG. 11 is a graph showing relations between the $Yb_2O_3$ addition amount and the discharge utilization in example 6.

This example relates to a nickel electrode.
[Making-up of Electrode and Battery]
Batteries were made up in the same procedures as those of the example 5 except that the addition amount of $Yb_2O_3$ was set variously. The addition amount (wt %) of $Yb_2O_3$ was varied as 0, 0.1, 0.5, 1.0, 2.5, 5.0 and 10.0.
[Test]
Discharge utilizations at various temperature were measured on the foregoing batteries. FIG. 11 shows these results. As obvious from FIG. 11, high-temperature performances are improved by adding $Yb_2O_3$. However, the utilization at ordinary temperature becomes worse when the addition amount is larger than 5 wt % and the utilization at high temperature becomes worse when the addition amount is smaller than 0.5 wt %. Therefore, it is desirable to set the addition amount within a range of 0.5 to 5.0 wt %.

EXAMPLE 7

This example relates to a nickel electrode.
[Making-up of Electrode]
High-density spherical nickel hydroxide powder containing 5 wt % of Zn as a solid solution was added to 10 wt % of CoO powder. This is named as a mixed powder X1.

The mixed powder X1 was mixed with a thickener to be formed into a paste. The paste was filled in a nickel porous substrate to make up a nickel electrode. This is named as a comparison electrode 7a.

On the other hand, the mixed powder X1 was sufficiently mixed with 2.5 wt % of holmium oxide powder, and added with a thickener to be formed into a paste. The paste was filled in a nickel porous substrate to make up a nickel electrode. This is named as an example electrode 7A.

Example electrodes 7B & 7C were made up in the same procedures as those of the example electrode 7A except that erbium oxide powder and ytterbium oxide powder were added respectively, in place of the holmium oxide powder.

Comparison electrodes 7b, 7c & 7d were made up in the same procedures as those of the example electrode 7A except that lanthanum oxide powder, cerium oxide powder and gadolinium oxide powder were added respectively, in place of the holmium oxide powder.
[Making-up of Battery]
The foregoing electrodes were wrapped by nylon separators and ordinary hydrogen absorbing electrodes were utilized for negative electrodes, so that nickel hydride storage batteries were made up. The batteries thus made up are named as example batteries 7A, 7B & 7C and comparison batteries 7a, 7b, 7c & 7d in correspondence with the example electrodes 7A, 7B & 7C and comparison electrodes 7a, 7b, 7c & 7d.
[Test]
Making the positive electrode capacity smaller than the negative electrode capacity, charge/discharge cycle tests were done in potassium hydroxide aqueous solution having a specific gravity of 1.28. The charging was carried out for 15 hours using a current of 30 mA (corresponding to 0.1 C), and the discharging was terminated at 0V relative to Hg/HgO reference electrode using a current of 60 mA.

Figure 12:
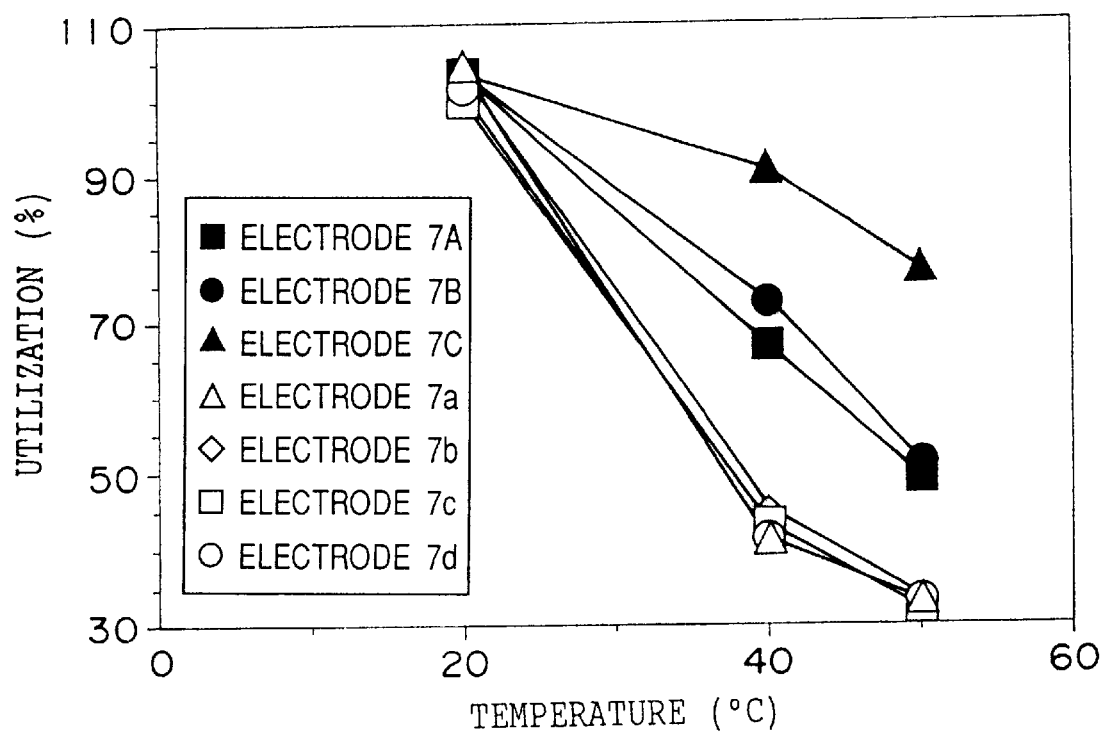
FIG. 12 is a graph showing relations between the temperature change and the positive electrode capacity utilization for electrodes of example 7.

FIG. 12 shows the relations between the temperature change and the positive electrode capacity utilization (percentage relative to theoretical capacity of positive electrode). As obvious from FIG. 12, the utilizations lower extremely with a rise of temperature in the comparison electrodes 7a, 7b, 7c & 7d, however, an extent of lowering is small in the example electrodes 7A, 7B & 7C. Especially, the extent of lowering is very small in the example electrode 7C, so that this electrode maintains a stable capacity even at a low temperature.

As mentioned above, according to the nickel electrodes of this example, a range of increase and decrease in capacity can be made small over a wide temperature region from low to high temperatures. Thus, a stability can be improved.

EXAMPLE 8

This example relates to a nickel electrode.
[Making-up of Electrode]
High-density spherical nickel hydroxide powder containing 3 wt % of Zn as a solid solution was added to 10 wt % of CoO powder. This is named as a mixed powder X2.

The mixed powder X2 was mixed with a thickener to be formed into a paste. The paste was filled in a nickel porous substrate to make up a nickel electrode. This is named as a comparison electrode 8a.

On the other hand, the mixed powder X2 was sufficiently mixed with 2.5 wt % of ytterbium oxide powder, and added with a thickener to be formed into a paste. The paste was filled in a nickel porous substrate to make up a nickel electrode. This is named as an example electrode 8A.

High-density spherical nickel hydroxide powder containing 3 wt % of Zn and 3 wt % of Co as a solid solution was mixed to 10 wt % of CoO. The mixed powder was sufficiently mixed with 2.5 wt % of ytterbium oxide powder, and added with a thickener to be formed into a paste. The paste was filled in a nickel porous substrate to make up a nickel electrode. This is named as an example electrode 8B.

High-density spherical nickel hydroxide powder containing 3 wt % of Zn and 5 wt % of Co as a solid solution was mixed to 10 wt % of CoO. The mixed powder was sufficiently mixed with 2.5 wt % of ytterbium oxide powder, and added with a thickener to be formed into a paste. The paste was filled in a nickel porous substrate to make up a nickel electrode. This is named as an example electrode 8C.
[Making-up of Battery]
Utilizing the foregoing electrodes, AA-size nickel hydroxide batteries with capacity of 1,100 mAh were made up according to a well-known method. The batteries thus made up were named as example batteries 8A, 8B & 8C and a comparison battery 8a in correspondence with the example electrodes 8A, 8B & 8C and the comparison electrode 8a.
[Test]
Charge/discharge cycle tests were done. The charging was carried out for 15 hours using a current of 100 mA, and the discharging was terminated at 1.0V using a current of 200 mA.

Figure 13:
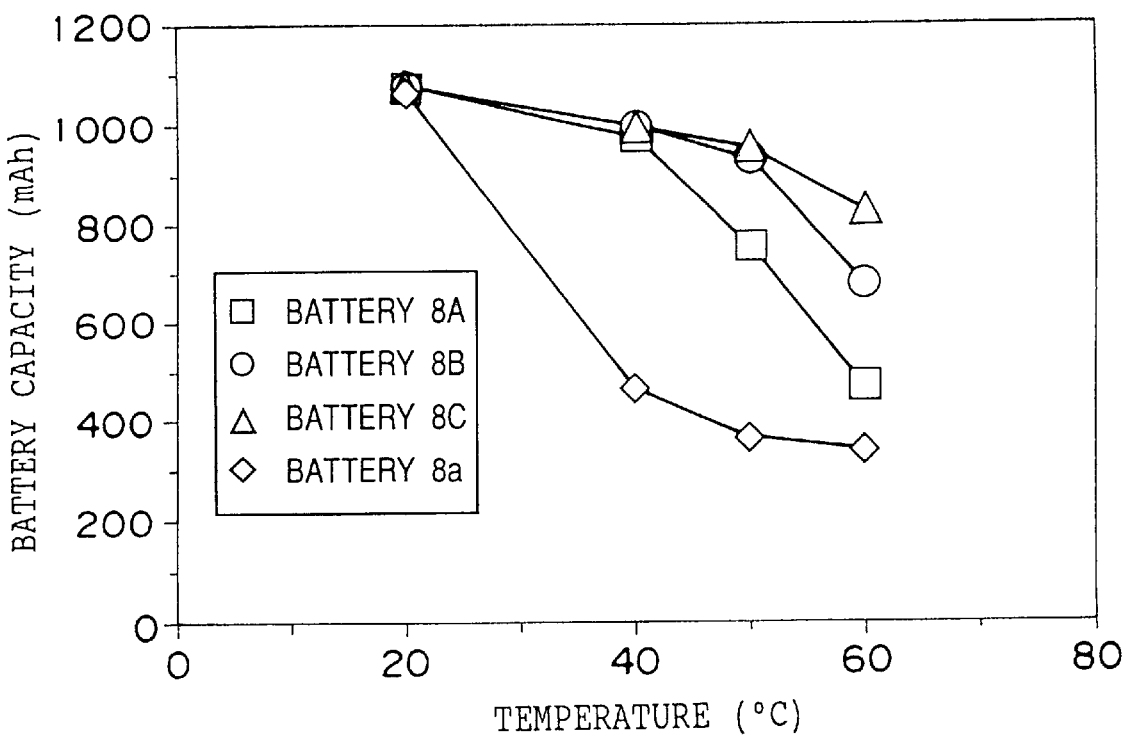
FIG. 13 is a graph showing relations between the temperature change and the battery capacity for batteries of example 8.

FIG. 13 shows the relations between the temperature change and the battery capacity. As obvious from FIG. 13, the capacity reductions due to the temperature change are small in the example batteries 8A, 8B & 8C as compared with the comparison battery 8a. The capacity of the comparison battery 8a at a high temperature higher than 40° C. lowers to a value smaller than 50% of that at 20° C. However, especially the capacity of the example battery 8C even at a temperature as high as 60° C. keeps a value equal to 70% of that at 20° C. A difference between capacities of the example battery 8A and the example battery 8B indicates that a charge efficiency becomes larger by synergetic effect offered between Co as a solid solution and rare earth element in the example battery 8B.

As mentioned above, according to the nickel electrode of this example, a range of increase and decrease in capacity can be made small over a wide temperature region from low to high temperatures. Thus, a stability can be improved.

EXAMPLE 9

This example relates to a nickel electrode.
[Making-up of Eelectrode]
High-density spherical nickel hydroxide powder containing 5 wt % of Zn as a solid solution was added to 10 wt % of CoO powder. This is named as a mixed powder X1.

The mixed powder X1 was mixed with a thickener to be formed into a paste. The paste was filled in a nickel porous substrate to make up a nickel electrode. This is named as a comparison electrode 9a.

On the other hand, the mixed powder X1 was sufficiently mixed with 2.5 wt % of ytterbium oxide powder, and added with a thickener to be formed into a paste. The paste was filled in a nickel porous substrate to make up an example electrode 9A.

Commercially available ytterbium nitrate solution was neutralized by alkali to prepare a hydroxide. An example electrode 9B was made up in the same procedures as those of the example electrode 9A except that 2.5 wt % of the above hydroxide powder was sufficiently mixed to the mixed powder X1.

An example electrode 9C was made up in the same procedures as those of the example electrode 9A except that the mixed powder X1 was sufficiently mixed to 2.5 wt % of commercially available ytterbium fluoride.

[Making-up of Battery]
Utilizing the foregoing electrodes, nickel hydride storage batteries were made up in the same procedures as those of the example 7. The batteries thus made up were named as example batteries 9A, 9B & 9C and a comparison battery 9a in correspondence with the example electrodes 9A, 9B & 9C and the comparison electrode 9a.

[Test]
Charge/discharge cycle tests same as those of the example 7 were done.

Figure 14:
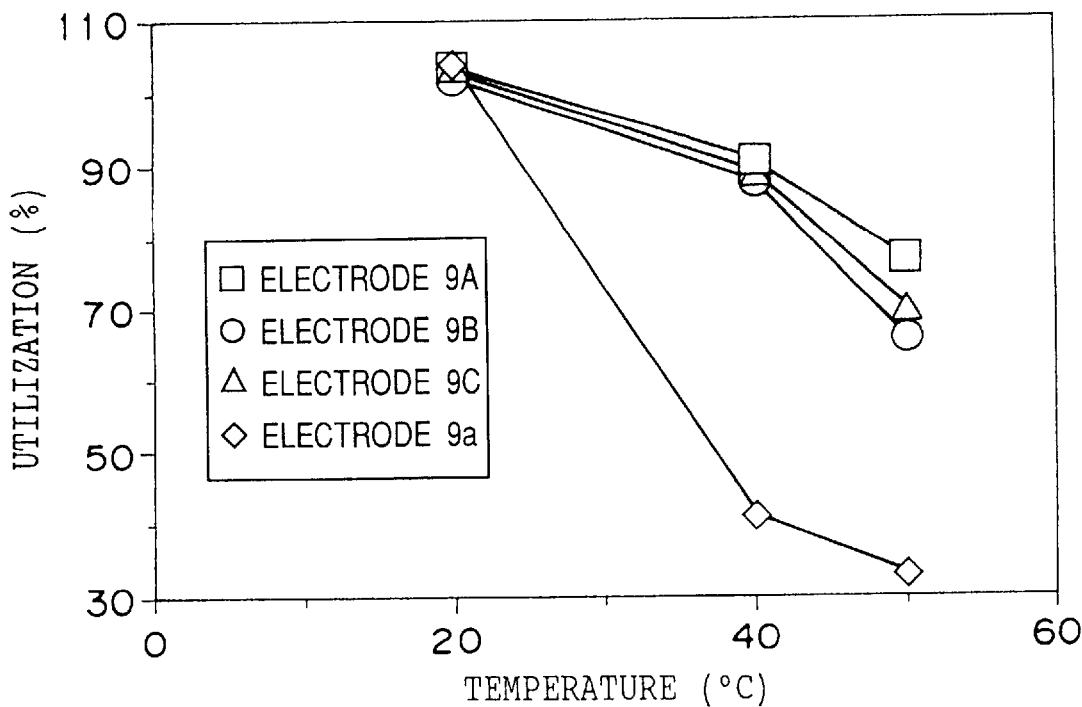
FIG. 14 is a graph showing relations between the temperature change and the positive electrode capacity utilization for electrodes of example 9.

FIG. 14 shows the relations between the temperature change and the positive electrode capacity utilization (percentage relative to theoretical capacity of positive electrode). As obvious from FIG. 14, the utilizations extremely lower with a rise of temperature in the comparison electrode 9a, however, high capacities are offered by the example electrodes 9A, 9B & 9C even at 50° C.

As mentioned above, according to the nickel electrode of this example, a range of increase and decrease in capacity can be made small over a wide temperature region from low to high temperatures. Thus, a stability can be improved.

EXAMPLE 10

This example relates to a nickel electrode.
[Making-up of Electrode]
High-density spherical nickel hydroxide powder containing 5 wt % of Zn as a solid solution and having an internal pore volume of 0.03 ml/g was mixed with 10 wt % of CoO powder. The mixed powder was sufficiently mixed with 2.5 wt % of ytterbium oxide powder, and added with a thickener to be formed into a paste. The paste was filled in a nickel porous substrate to make up a nickel electrode. This is named as an example electrode 10A.

On the other hand, the nickel hydroxide powder prepared by a conventional neutralizing method and containing 5 wt % of Zn as a solid solution and having an internal pore volume of 0.14 ml/g, was sufficiently mixed with 2.5 wt % of ytterbium oxide powder, and added with a thickener to be formed into a paste. The paste was filled in a nickel porous substrate to make up a nickel electrode. This is named as a comparison electrode 10a.

[Making-up of Battery]
Utilizing the foregoing electrodes, nickel hydride storage batteries were made up in the same procedures as those of the example 7. The batteries thus made up were named as an example battery 10A and a comparison battery 10a in correspondence with the example electrode 10A and the comparison electrode 10a.

[Test]
Charge/discharge cycle tests same as those of the example 7 were done.

The charge/discharge cycle tests carried out at 20° C. proved that the utilization of positive electrode capacity was 100% for the example electrode 10A but it was 96% for the comparison electrode 10a. The charge/discharge cycle tests carried out at 50° C. proved that the utilization of positive electrode capacity was 72% for the example electrode 10A but it was 61% for the comparison electrode 10a. It was found, in discharge tests using a current of 1,800 mA (corresponding to 3C), that the utilization of the comparison electrode 10a became extremely small but a high capacity was provided by the example electrode 10A.

As mentioned above, according to the nickel electrodes of this example, a range of increase and decrease in capacity can be made small over a wide temperature region from low to high temperatures. Thus, a stability can be improved. In addition, high-rate discharge characteristics can be improved, the stability at high temperature and the high capacity can be achieved.

In the above description, the addition amount of ytterbium oxide powder is 2.5 wt %, however, an addition amount smaller than this value may provide a sufficient utilization at high temperature. An addition amount larger than 2.5 wt % will further increase the utilization at high temperature, however, an utilization up to and around 20 wt % is preferable in consideration of the cost problem.

EXAMPLE 11

This example relates to a nickel electrode.
[Making-up of Nickel Hydroxide Powder and Electrode]
Nickel electrodes having components as listed in Table 2 were made up in the following procedures.

Sodium hydroxide aqueous solution was dropped in and stirred with aqueous solution prepared by adding a specified quantity of ytterbium nitrate to nickel nitrate. A pH of it was kept to within a range of 11 to 14, and nickel hydroxide particles were deposited, rinsed and dried. Thus, nickel hydroxide powder containing Yb as a solid solution was prepared. The nickel hydroxide powder was mixed with CoO powder as a conductive adjuvant, and added with aqueous solution dissolving a thickener to be formed into a paste. The paste was filled in nickel fiber substrates, dried and pressed to a specified thickness. Thus, nickel electrodes were made up. Thereby, example electrodes 11A & 11B were prepared.

Nickel hydroxide powder containing Yb and Co as a solid solution was prepared in the same procedures as those of the example electrode 11A except that cobalt nitrate was added together with the ytterbium nitrate. Further, an example electrode 11C was made up in the same procedures.

Nickel hydroxide powder containing Yb and Zn as a solid solution was prepared in the same procedures as those of the example electrode 11A except that zinc nitrate was added together with the ytterbium nitrate. Further, an example electrode 11D was made up in the same procedures.

Nickel hydroxide powder containing Yb, Zn and Co as a solid solution was prepared in the same procedures as those of the example electrode 11A except that zinc nitrate and cobalt nitrate were added together with the ytterbium nitrate. Further, an example electrode 11E was made up in the same procedures.

Comparison electrodes 11a, 11b & 11c were made up respectively in the same procedures as those of the example electrodes 11A, 11B & 11C except that the ytterbium nitrate was not added.

[TABLE 2]

| electrode | $Ni(OH)_2$ wt % | $Yb(OH)_2$ wt % | $Co(OH)_2$ wt % | $Zn(OH)_2$ wt % |
|---|---|---|---|---|
| 11A | 97 | 3 | — | — |
| 11B | 94 | 5 | — | — |
| 11C | 92 | 3 | 3 | — |
| 11D | 94 | 3 | — | 5 |
| 11E | 89 | 3 | 3 | 5 |
| 11a | 100 | — | — | — |
| 11b | 95 | — | 3 | — |
| 11c | 97 | — | — | 5 |

[Making-up of Battery]

Utilizing the foregoing electrodes for serving as positive electrodes and well-known hydrogen absorbing electrodes for serving as negative electrodes, electrode groups restricted in their positive electrode capacities were constructed. Then, potassium hydroxide aqueous solution having a specific gravity of 1.28 was poured excessively for serving as an electrolyte. After leaving them as they were for 24 hours, charging and discharging were repeated for five cycles to complete full activation. One cycle was such that, the charging was done for 15 hours using a current corresponding to 0.1 C of the nickel electrode theoretical capacity, and discharging was done until a potential between both electrodes dropped down to 1V using a current corresponding to 0.2 C. Thereby, nickel hydride storage batteries were made up. The batteries thus made up were named as example batteries 11A, 11B, 11C, 11D & 11E and comparison batteries 11a, 11b & 11c in correspondence with the example electrodes 11A, 11B, 11C, 11D & 11E and the comparison electrodes 11a, 11b & 11c.

[Test]

Various charge/discharge tests were done on the foregoing batteries.

Figure 15:
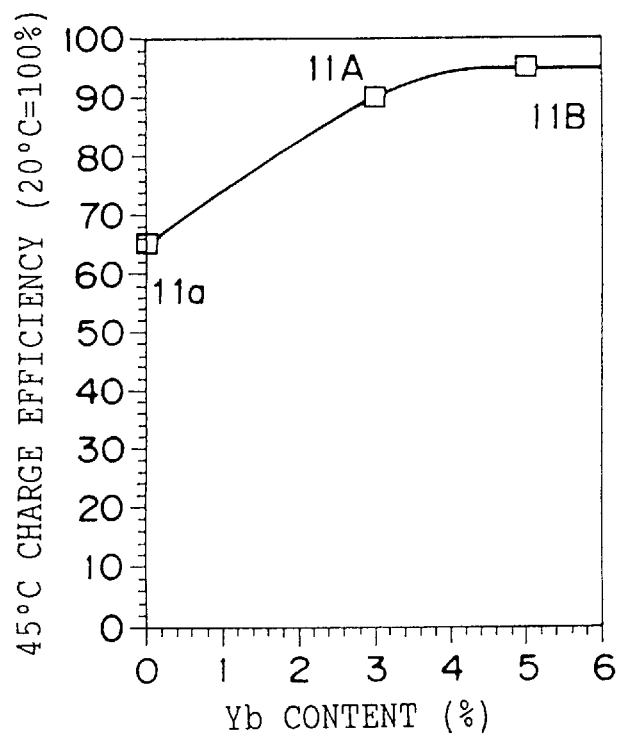
FIG. 15 is a graph showing relations between the high-temperature charge efficiency and the Yb content for batteries of example 11.

(1) Relations between high-temperature charge efficiencies and Yb contents were examined on the example batteries 11A & 11B and the comparison battery 11a. FIG. 15 shows these results. Test conditions were such that, under a temperature of 45° C., the charging was done for 15 hours using a current corresponding to 0.1 C of the nickel electrode theoretical capacity, and the discharging was done until a potential between both electrodes got to 1V using a current corresponding to 0.2 C. The charge efficiencies at 45° C. were expressed by percentage assuming that a charge efficiency at 20° C. was 100.

As obvious from FIG. 15, the charge efficiency increases with an increase in the Yb content. This is because an oxygen overvoltage of the nickel hydroxide rises when Yb is contained as a solid solution. As the Yb content is increased, the oxygen overvoltage becomes high, a potential difference between the charge reaction and the oxygen evolution reaction can be increased, and the charge efficiency can be improved.

Figure 16:
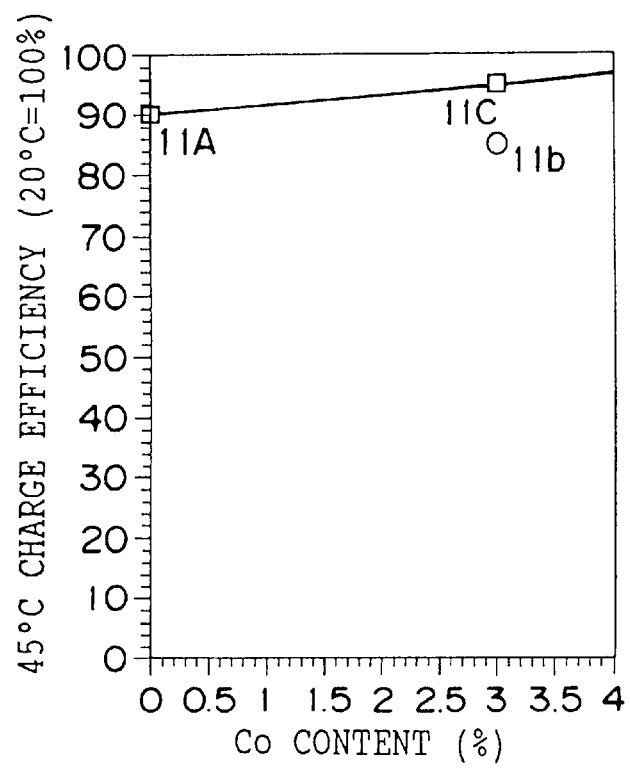
FIG. 16 is a graph showing relations between the high-temperature charge efficiency and the Co content for batteries of example 11.

(2) Relations between high-temperature charge efficiencies and Co contents were examined on the example batteries 11A & 11C and the comparison battery 11b. FIG. 16 shows these results. Test conditions were the same as those of the above (1).

The following facts are understood from FIG. 16. The high-temperature charge efficiencies are comparatively large when Co is contained even if Yb is not contained. However, the example batteries 11A & 11C containing Yb are superior to the comparison battery 11b in terms of the high-temperature charge efficiency. In addition, the example battery 11C containing Co and Yb is superior to the example battery 11A only containing Yb in terms of the high-temperature charge efficiency. The reason is supposed to be a fact that the potential difference between charge reaction and oxygen evolution reaction at high temperature can be made large by the synergistic effect with Yb because Co has an effect to further shift the charge reaction potential at high temperature to the base side. Moreover, it can be expected that, the conductivity of nickel hydroxide particles is improved and the active material utilization can be increased, when Co takes a form of higher order oxide. However, it is required to limit the Co addition amount to an appropriate range because the discharge reaction potential is also shifted to the base side when Co is added excessively.

Figure 17:
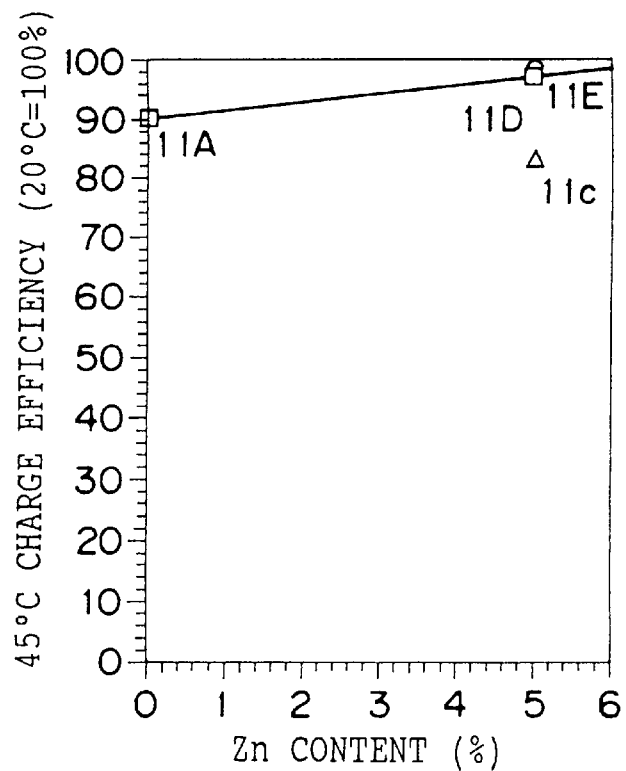
FIG. 17 is a graph showing relations between the high-temperature charge efficiency and the Zn content for batteries of example 11.

(3) Relations between high-temperature charge efficiencies and Zn contents were examined on the example batteries 11A, 11D & 11E and the comparison battery 11c. FIG. 17 shows these results. Test conditions were the same as those of the above (1).

The following facts are understood from FIG. 17. The high-temperature charge efficiencies are improved in the example battery 11D containing Zn & Yb and the example battery 11E containing Zn, Co & Yb. However, the high-temperature charge efficiency is rather reduced in the comparison battery 11c containing Zn but not containing Yb. Further, the example battery 11D containing Zn and Yb is superior to the example battery 11A containing Yb only, in terms of the high-temperature charge efficiency. The reason is supposed to be a fact that the potential difference between charge reaction and oxygen evolution reaction of the nickel hydroxide can be made large because Zn has an effect to shift the oxygen evolution potential to the noble side. Further, the crystal structure of nickel hydroxide can be deformed because an ion radius of Zn is different from that of Ni. Therefore, it can be expected that not only the active material utilization can be improved but the electrode swelling due to formation of γ-NiOOH can be controlled. The case where only Zn is added is inferior to the case where only Yb is added, in terms of the high-temperature charge efficiency in such effect of Zn. Moreover, in case where Zn is added together with Yb or together with Yb and Co, the effect of Zn is not impaired, but a synergistic effect with Yb and Co can be offered preferably.

As mentioned above, according to the nickel electrode of this example, the charge/discharge efficiency can be improved over a wide range of temperature, and the stability of capacity characteristic can be improved.

In this example, the same effect can be obtained when other rare earth elements such as Eu and Er are used in place of Yb.

EXAMPLE 12

This example relates to a nickel electrode.
[Making-up of Electrode]

High-density spherical nickel hydroxide powder containing 5 wt % of Zn as a solid solution was added to 10 wt % of CoO powder. This is named as a mixed powder X1.

The mixed powder X1 was mixed with a thickener to be formed into a paste. The paste was filled in a nickel porous substrate to make up a nickel electrode. This is named as a comparison electrode 12a.

On the other hand, a composite oxide was formed, in which content ratio (wt % contrast) of $Yb_2O_3$ to $Lu_2O_3$ was fixed to a specified value. 2.5 wt % of this composite oxide were sufficiently mixed to the mixed powder X1 in a mortar, and added with a thickener to be formed into a paste. The paste was filled in nickel porous substrates so as to prepare nickel electrodes. In this case, the content ratio of $Yb_2O_3$ to $Lu_2O_3$ was varied as 100:0, 85:15, and 75:25. The nickel electrodes thus prepared are named as example electrodes 12A, 12B & 12C.

While, $Yb_2O_3$ powder and $Lu_2O_3$ powder were mixed at a specified ratio (wt % contrast). 2.5 wt % of the mixed powder was sufficiently mixed to the mixed powder X1 in a mortar, and added with a thickener to be formed into a paste. The paste was filled in nickel porous substrates so as to prepare nickel electrodes. In this case, the ratio of $Yb_2O_3$ powder to $Lu_2O_3$ powder was varied as 90:10 and 75:25. The nickel electrodes thus made up are named as example electrodes 12D & 12E.

An example electrode 12F was made up in the same procedures as those of the example electrode 12A except that a composite oxide was formed in which a content ratio (wt % contrast) between $Ho_2O_3$, $Er_2O_3$, $Tm_2O_3$, $Yb_2O_3$, $Lu_2O_3$, & $Y_2O_3$ was 15:25:10:30:5:15.

Further, example electrodes 12G, 12H & 12I was made up in the following procedures. CoO powder was mixed to metallic Co powder at a specified ratio (wt % contrast). The ratio was so set that the total cobalt quantities of them were equal each other. 10 wt % (converted to CoO) of cobalt mixed powder were mixed to high-density spherical nickel hydroxide powder containing 5 wt % of Zn as a solid solution. The nickel mixed powder was mixed with 2.5 wt % of composite oxide of rare earth elements, and added with a thickener to be formed into a paste. The paste was filled in nickel porous substrates to make up nickel electrodes. The composite oxide was such that containing $Yb_2O_3$ and $Lu_2O_3$ at a ratio (wt % contrast) of 85:15. In this case, the mixing ratio of CoO powder and Co metal powder was varied as 9:0.78, 8:1.57 & 7:2.36 and the nickel electrodes thus made up are named as example electrodes 12G, 12H & 12I.

[Making-up of Battery]

Utilizing the foregoing electrodes, separators and the hydrogen absorbing electrodes; cells controlled in their positive electrodes were prepared. Utilizing 6.8-normal sodium hydroxide aqueous solution for serving as an electrolyte, nickel hydride storage batteries were made up. The batteries thus made up were named as example batteries 12A, 12B, 12C, 12D, 12E, 12F, 12G, 12H & 12I and a comparison battery 12a in correspondence with the example electrodes 12A, 12B, 12C, 12D, 12E, 12F, 12G, 12H & 12I and a comparison electrode 12a.

[Test]

Under conditions of sufficient electrolyte, charge/discharge cycle tests were done on the foregoing batteries. The charging was done for 15 hours using a current of 0.1 CmA, and the discharging was done until the positive electrode potential got down to 0V relative to Hg/HgO reference electrode using a current of 0.2 CmA.

Table 3 shows active material utilizations of fifth cycle at 20° C., active material utilizations of fifth cycle at 50° C., and η values (difference between oxidizing potential and oxygen evolution potential) at 20° C. and 40° C., respectively.

[TABLE 3]

| battery | 20° C., utilization factor (%) | 50° C., utilization factor (%) | 20° C., η (mV) | 40° C., η (mV) |
| --- | --- | --- | --- | --- |
| 12A | 100.3 | 64.2 | 65.0 | 24.8 |
| 12B | 100.3 | 64.3 | 66.3 | 25.2 |
| 12C | 100.4 | 65.1 | 67.2 | 26.5 |
| 12D | 100.1 | 50.2 | 59.5 | 11.6 |
| 12E | 100.6 | 64.4 | 66.0 | 24.9 |
| 12F | 100.2 | 65.5 | 67.4 | 25.8 |
| 12a | 100.2 | 30.4 | 56.7 | 2.2 |

As obvious from Table 3, the example batteries 12A through 12F offered large η values at high temperature and large utilizations as compared with the comparison battery 12a. It was confirmed that the oxygen evolution potentials of the example batteries 12A through 12F were shifted to the noble side as compared with the comparison battery 12a.

Table 4 shows active material utilizations in 0.2 C discharging and 5 C discharging at 20° C.

[TABLE 4]

| battery | 0.2 C discharging, utilization factors (%) | 5 C discharging utilization factors (%) |
| --- | --- | --- |
| 12B | 100.3 | 84.7 |
| 12G | 101.4 | 90.1 |
| 12H | 102.1 | 90.6 |
| 12I | 101.8 | 92.1 |
| 12a | 100.2 | 84.8 |

The example batteries 12G, 12H & 12I offer large active material utilizations in 5 C discharging as compared with the comparison battery 12a.

Even when the example electrodes 12A, 12B, 12C, 12D, 12E, 12F, 12G, 12H & 12I are used for the sealed-type battery, rises in battery inner pressure become small because the oxygen evolution reaction in charging at high temperature is controlled. Therefore, the battery service life is prolonged remarkably.

As mentioned above, according to the nickel electrodes of this example, the performance at high temperature can be improved and a high energy density can be achieved.

The oxides of rare earth element are mixed or oxides are used for the composite compound in the above examples, however, the same effect may be provided when hydroxides or fluorides are used in place of the oxides.

Further, the same effect may be provided when cobalt oxyhydroxide, α cobalt hydroxide or β cobalt hydroxide is used in place of CoO and metallic Co. However, the quantity of metallic Co is preferably smaller than or equal to 3 wt % in order to control an increase in the discharge reverse quantity.

EXAMPLE 13

This example relates to an alkaline storage battery.
[Making-up of Nickel Electrode]

High-density nickel hydroxide powder containing Zn and Co as a solid solution was sufficiently mixed with 10 wt % of CoO powder for serving as a conductive adjuvant, and added with a thickener to be formed into a paste. The paste was filled in a nickel porous substrate, dried and pressed to a specified thickness, so that a nickel electrode was made up. This is named as a comparison electrode 13a.

A paste prepared by mixing $Yb_2O_3$ powder to a thickener was coated on a surface of the foregoing nickel electrode, by a quantity of 2.5 wt % relative to a quantity of the nickel hydroxide, and dried again to make up an example electrode 13A.

Further, high-density nickel hydroxide powder containing Zn and Co as a solid solution was sufficiently mixed with 10 wt % of CoO powder and 2.5 wt % of $Yb_2O_3$ powder, and added with a thickener to be formed into a paste. The paste was filled in a nickel porous substrate, dried and pressed to a specified thickness, so that a nickel electrode was made up. This is named as a comparison electrode 13b.

[Making-up of Battery]

Utilizing the foregoing electrodes for serving as positive electrodes, hydrogen absorbing electrodes for serving as negative electrodes, and potassium hydroxide aqueous solution having a specific gravity of 1.28 for serving as electrolytes; nickel hydride storage batteries were made up. The batteries thus made up are named as an example battery 13A and comparison batteries 13a & 13b in correspondence with the example electrode 13A and comparison electrodes 13a & 13b.

[Test]

Charge/discharge cycle tests were done on the foregoing batteries under a state of excessive electrolyte. The charging was done using a current of 0.1 C and the discharging was done using a current of 0.2 C.

Figure 18:
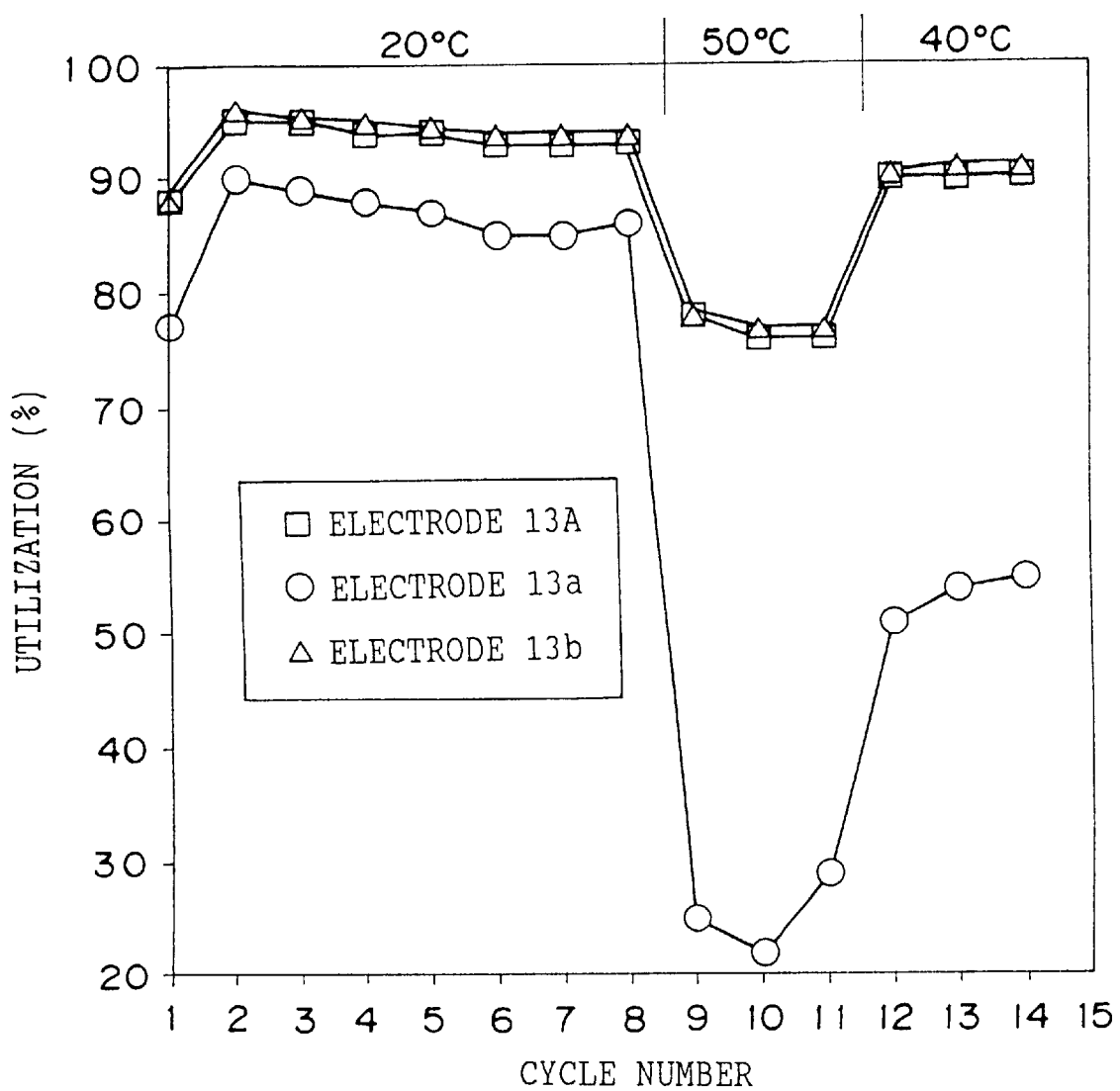
FIG. 18 is a graph showing relations between the cycle number and the utilization for electrodes of example 13.

FIG. 18 shows results of the charge/discharge. The example electrode 13A offered utilizations larger than those of the comparison electrode 13a not coated with $Yb_2O_3$, and differences of them were remarkable particularly at high temperature of 40° C. and 50° C. The comparison electrode 13b containing $Yb_2O_3$ offered utilizations equal to those of the example electrode 13A.

Figure 19:
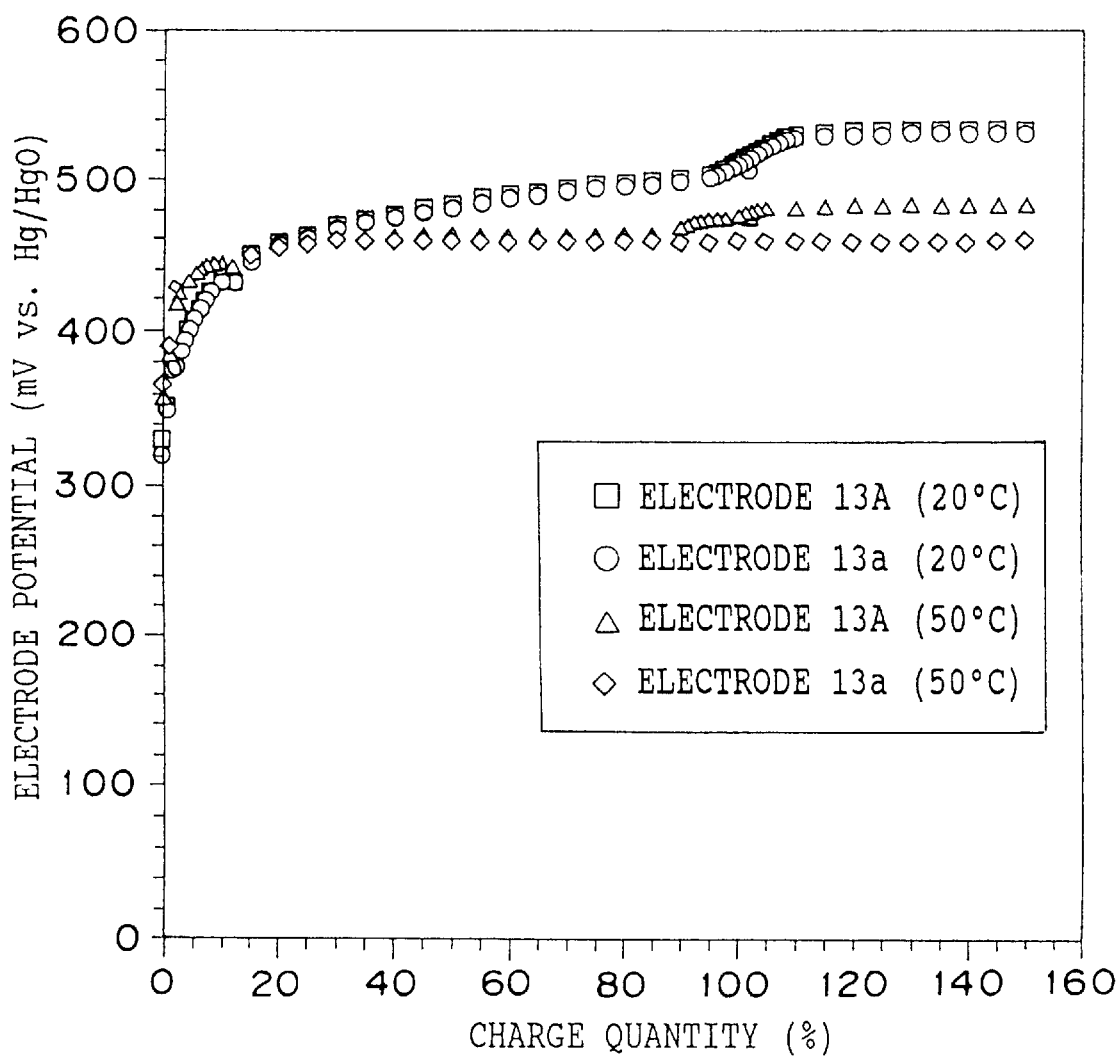
FIG. 19 is a graph showing the charge curves at 20° C. and 50° C. for electrodes of example 13.

FIG. 19 shows charge curves for the example electrode 13A and the comparison electrode 13a at 20° C. and 50° C. Oxygen overvoltages of the both electrodes 13A and 13a are approximately equal at 20° C. However, in the comparison electrode 13a at 50° C., the oxygen overvoltage does not rise even in the final stage of charging. Therefore, it can be understood that a charge acceptance is lessened. On the contrary, in the example electrode 13A, the oxygen overvoltage rises in the final stage of charging. Therefore, it can be understood that the charge acceptance is not lessened even at 50° C. The comparison electrode 13b offered utilizations at high temperature same as those of the example electrode 13A. This is caused by the oxygen overvoltage rise-up effect owing to the coated or mixed $Yb_2O_3$.

Figure 20:
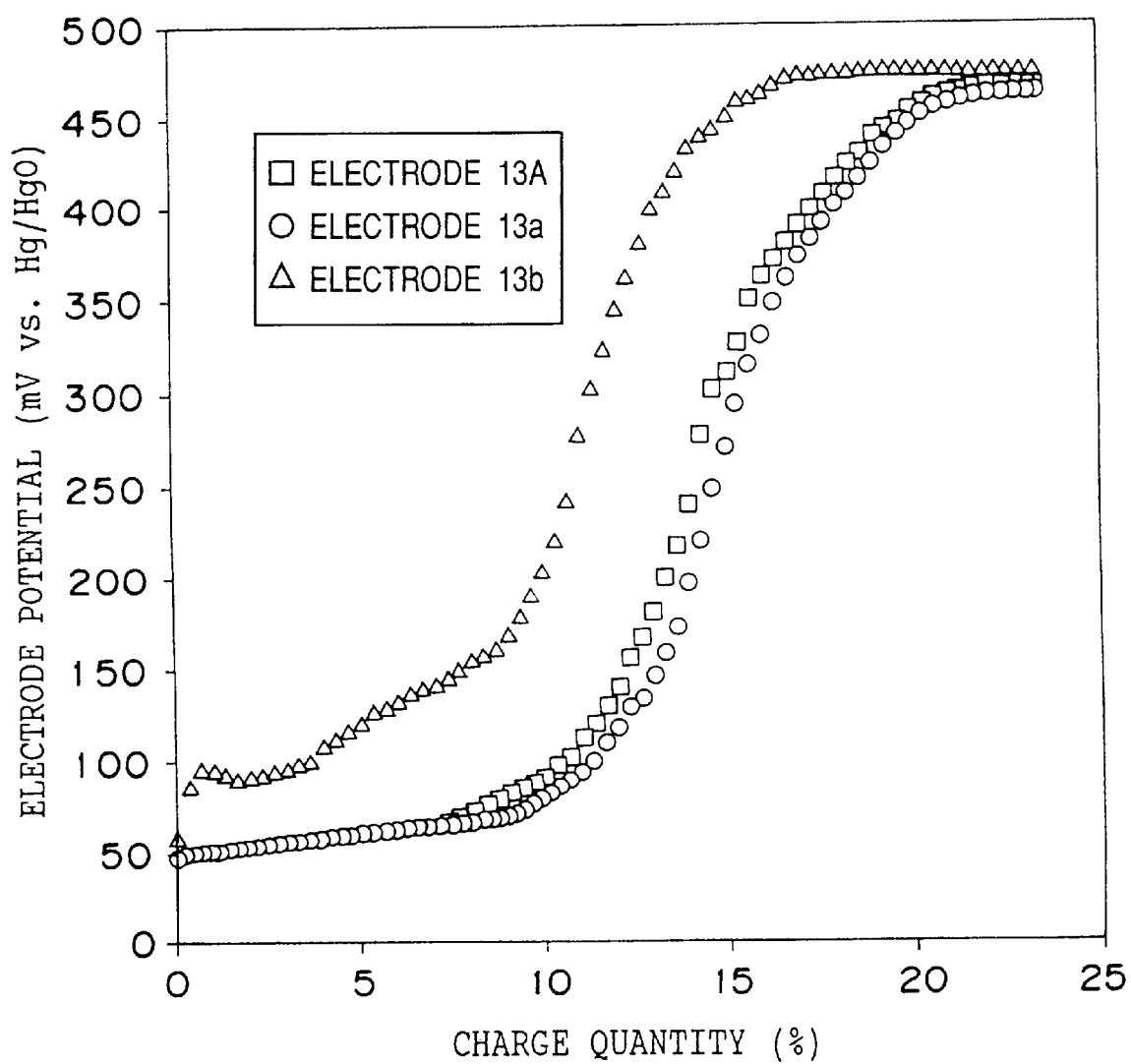
FIG. 20 is a graph showing the first cycle charge curve for electrodes of example 13.

FIG. 20 shows the first cycle charge curves for the example electrode 13A and the comparison electrodes 13a & 13b. The charging was done for seven hours using a current of 1/30 C. A part wherein constant potential can be seen in a range from 50 mV to 100 mV represents a conductive network formation reaction expressed by the following equation.

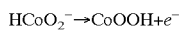

In the comparison electrode 13b, it can be foreseen that a period of reaction expressed by the above equation is short and the formation of conductive network is insufficient because the part of constant potential is short. This is owing to the fact that the mixed $Yb_2O_3$ restricts the dissolution of CoO. In the example electrode 13A, however, CoO in the electrode is dissolved smoothly and the conductive network is therefore sufficiently formed because $Yb_2O_3$ is coated on the electrode surface. An extent of formation of the conductive network in the example electrode 13A was approximately equal to that of the comparison electrode 13a not containing $Yb_2O_3$.

Figure 21:
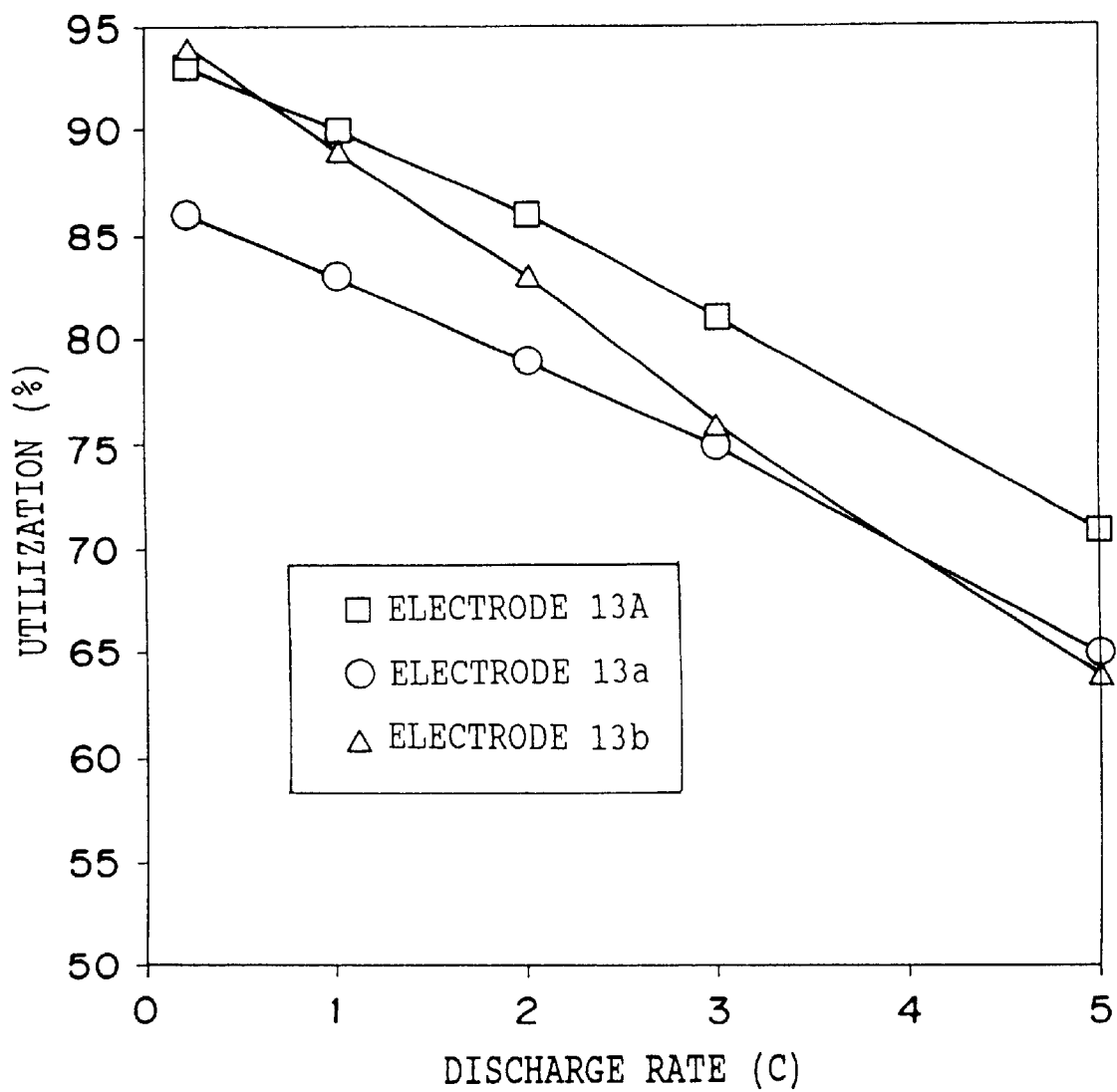
FIG. 21 is a graph showing the high-rate discharge characteristic for electrodes of example 13.

FIG. 21 shows high-rate discharge characteristics of the example electrode 13A and the comparison electrodes 13a & 13b. The comparison electrode 13b offers a remarkable drop in the high-rate discharge characteristics, as compared with the example electrode 13A and the comparison electrode 13a. The reason is supposed to the fact that, as described above, the formation of conductive network is insufficient in the comparison electrode 13b. A large drop in the high-rate discharge characteristic is not seen in the example electrode 13A because the formation of conductive network is sufficient in the example electrode 13A.

As mentioned above, according to the alkaline storage batteries of this example, the utilization of nickel electrode can be made large over a wide range of temperature and the drop in utilization at high temperature can be controlled. The high-rate discharge characteristic can be improved because the conductive network at initial charging can be formed sufficiently. Consequently, stable capacity characteristics and excellent cycle characteristics can be obtained.

EXAMPLE 14

This example relates to an alkaline storage battery.

[Making-up of Battery]

$Yb_2O_3$ powder was mixed to aqueous solution dissolving a thickener to be formed into a paste. The paste was coated uniformly on both sides of commercially available polyolefin non-woven cloth, and dried to form a separator. On the other hand, high-density nickel hydroxide powder containing Zn and Co as a solid solution was sufficiently mixed with 10 wt % of CoO powder for serving as a conductive adjuvant, and added with a thickener to be formed into a paste. The paste was filled in a nickel porous substrate, dried and pressed to a specified thickness. Thus, a nickel electrode was made up. An electrode group controlled in its positive electrode capacity was constructed by the foregoing separator, the nickel electrode and the hydrogen absorbing electrode. Thus, a sealed nickel hydride battery was made up by utilizing potassium hydroxide aqueous solution having a specific gravity of 1.28 for serving as an electrolyte. This is named as an example battery 14A.

An example battery 14B was made up in the same procedures as those of the example battery 14A except that $Yb_2O_3$ powder was mixed to aqueous solution dissolving a thickener to be formed into a paste and the paste was coated on only one side of the commercially available polyolefin non-woven cloth. In this case, the coated face of separator is so located as to contact with the nickel electrode.

A comparison battery 14a was made up in the same procedures as those of the example battery 14B except that the coated face of separator is so located as to contact with the hydrogen absorbing electrode.

Further, a comparison battery 14b was made up in the same procedures as those of the example battery 14A except that nothing was coated on the separator.

These batteries were sufficiently activated as follows. The electrolyte was poured in these batteries which in turn were left as they were for 48 hours at ordinary temperature. Then, charging and discharging were repeated on them for five cycles to complete full activation. One cycle was such that, the charging was done for 15 hours using a current corresponding to 0.1 C of the nickel electrode theoretical capacity, and the discharging was done until a potential between both electrodes dropped down to 1V using a current corresponding to 0.2 C.

[Test]

Figure 22:
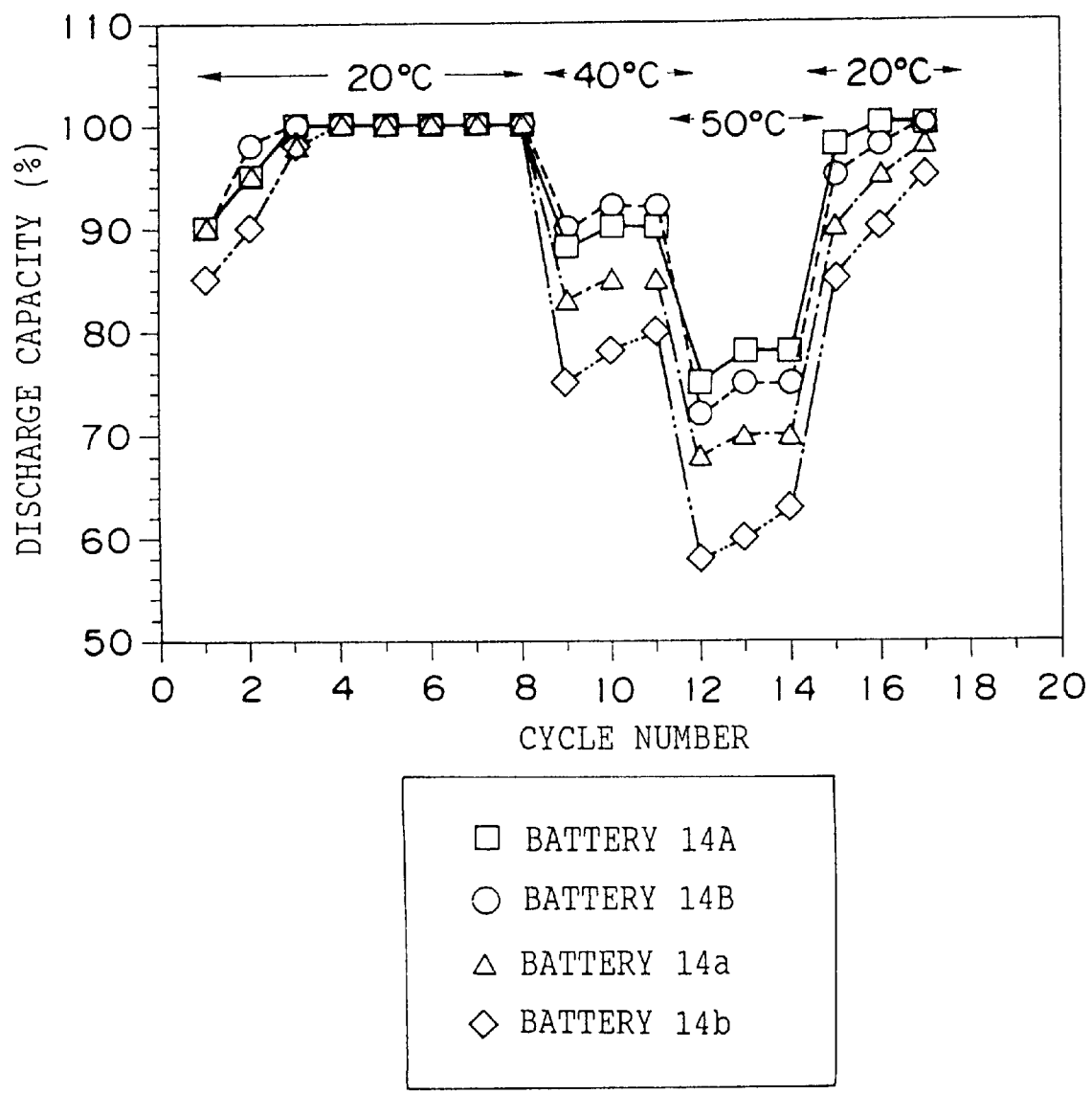
FIG. 22 is a graph showing results of the temperature characteristic test for batteries of example 14.

Charge/discharge cycle tests were done on the foregoing batteries to examine temperature characteristics. Test conditions were as follows. Under several temperature conditions, the charging was done for 15 hours using a current corresponding to 0.1 C of the nickel electrode theoretical capacity, and the discharging was done until a potential between both electrodes dropped down to 1V using a current corresponding to 0.2 C. FIG. 22 shows these results.

As obvious from FIG. 22, the example batteries 14A & 14B and the comparison battery 14a maintain sufficient capacities even after subjected to the charging and discharging at high temperatures, and present good capacity recoveries when brought back to ordinary temperature. This effect is outstanding especially in the example batteries 14A & 14B. This is because $Yb_2O_3$ is coated on the separator, so that the oxygen overvoltage of nickel hydroxide is raised to make large the potential difference between the charge reaction and oxygen evolution reaction, thereby the charge efficiency can be improved.

The foregoing batteries were disassembled after completion of the charge/discharge tests, active materials after subjected to the discharging were taken out of the nickel electrodes and the hydrogen absorbing electrodes. The materials were rinsed and dried, then analyzed by X-ray diffraction.

Figure 23:
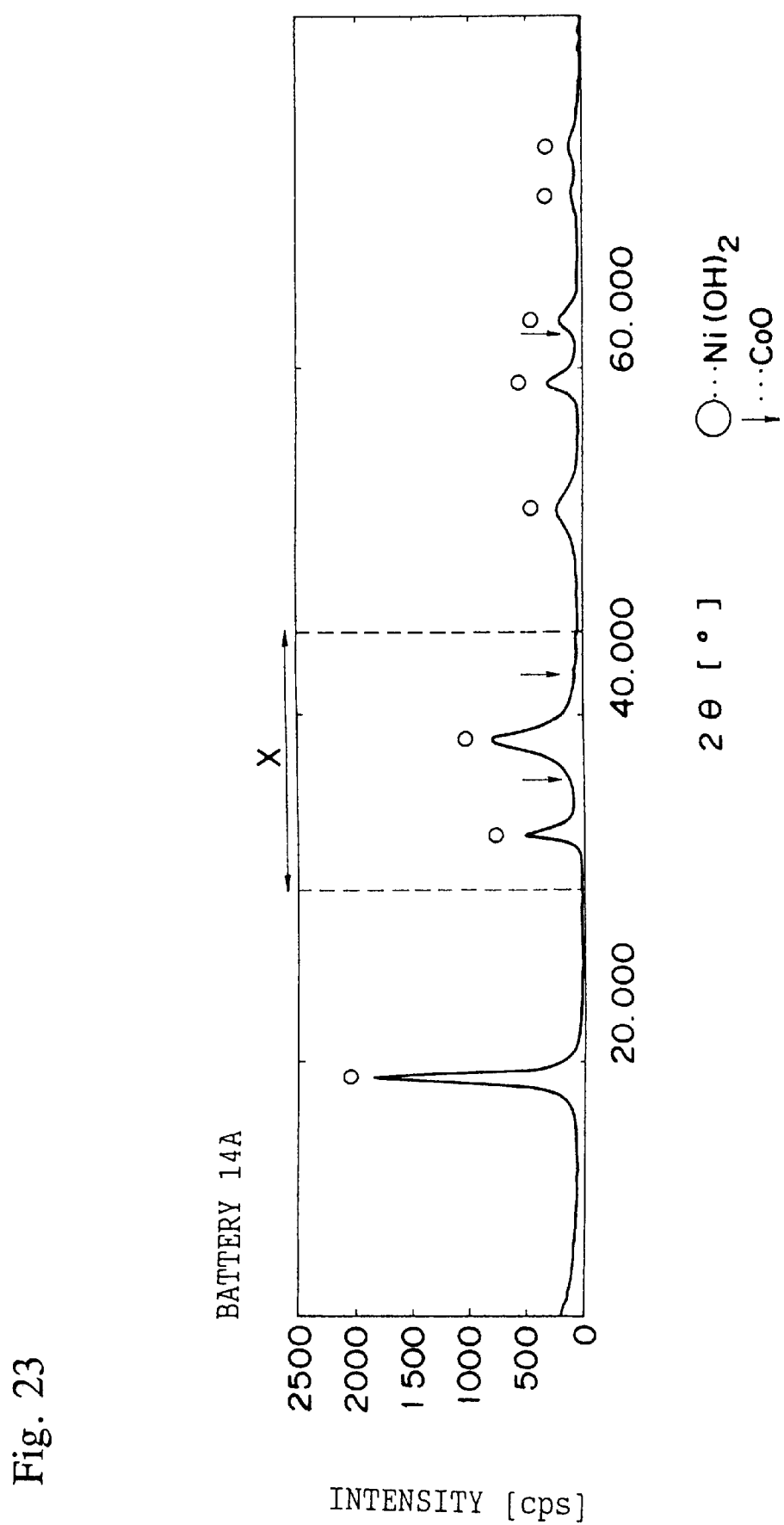
FIG. 23 through FIG. 28 are graphs showing the X-ray diffraction patterns for active materials of nickel electrodes of example 14.
Figure 24:
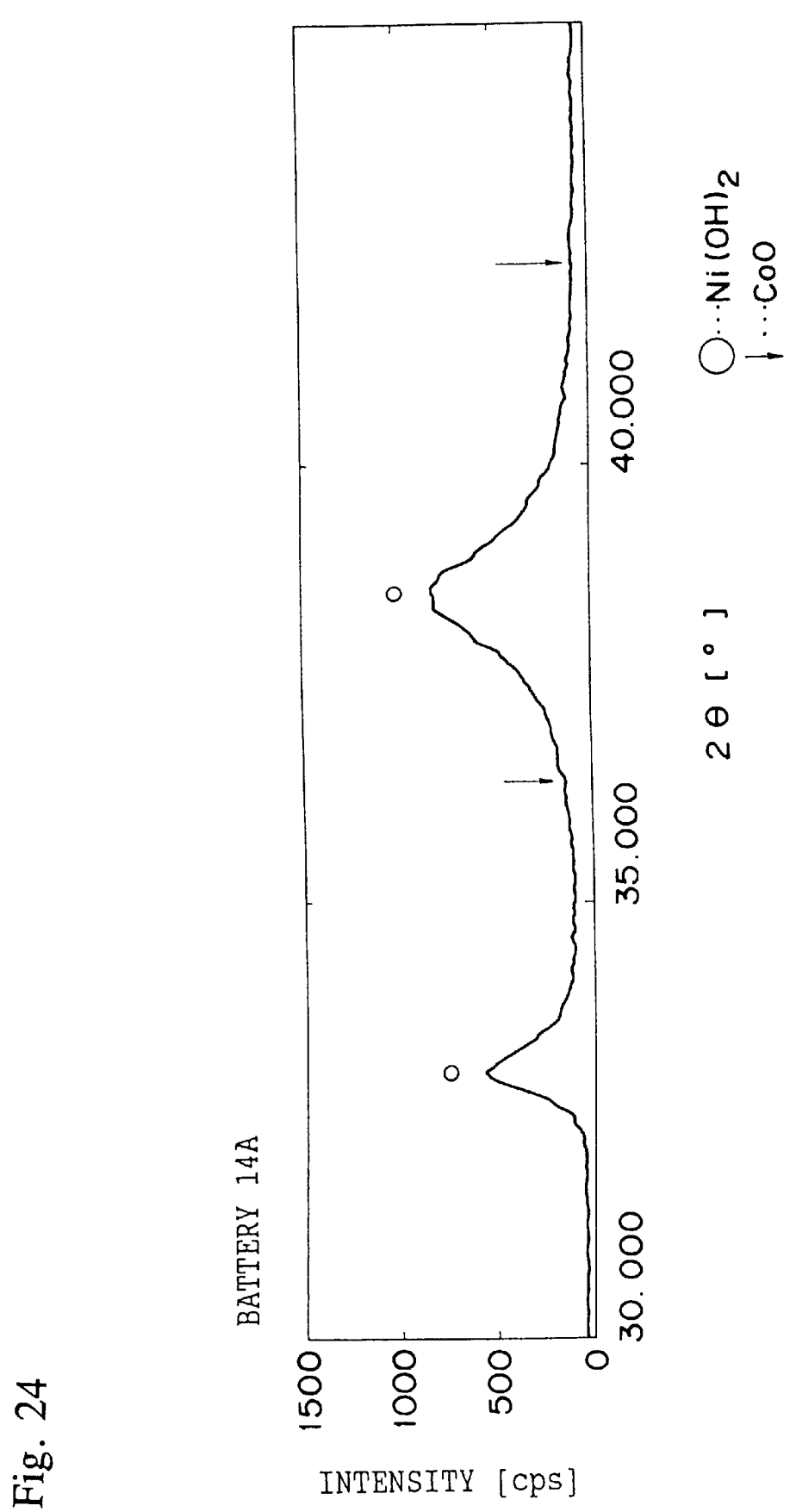
Figure 25:
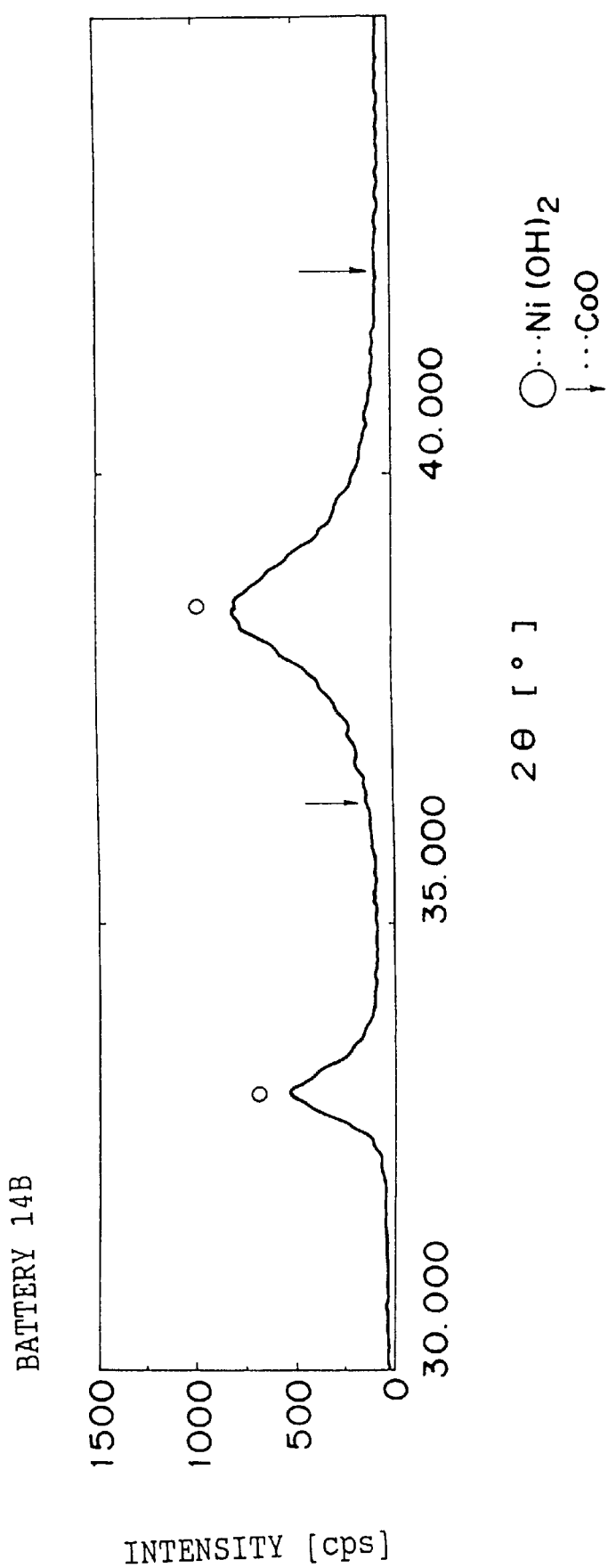
Figure 26:
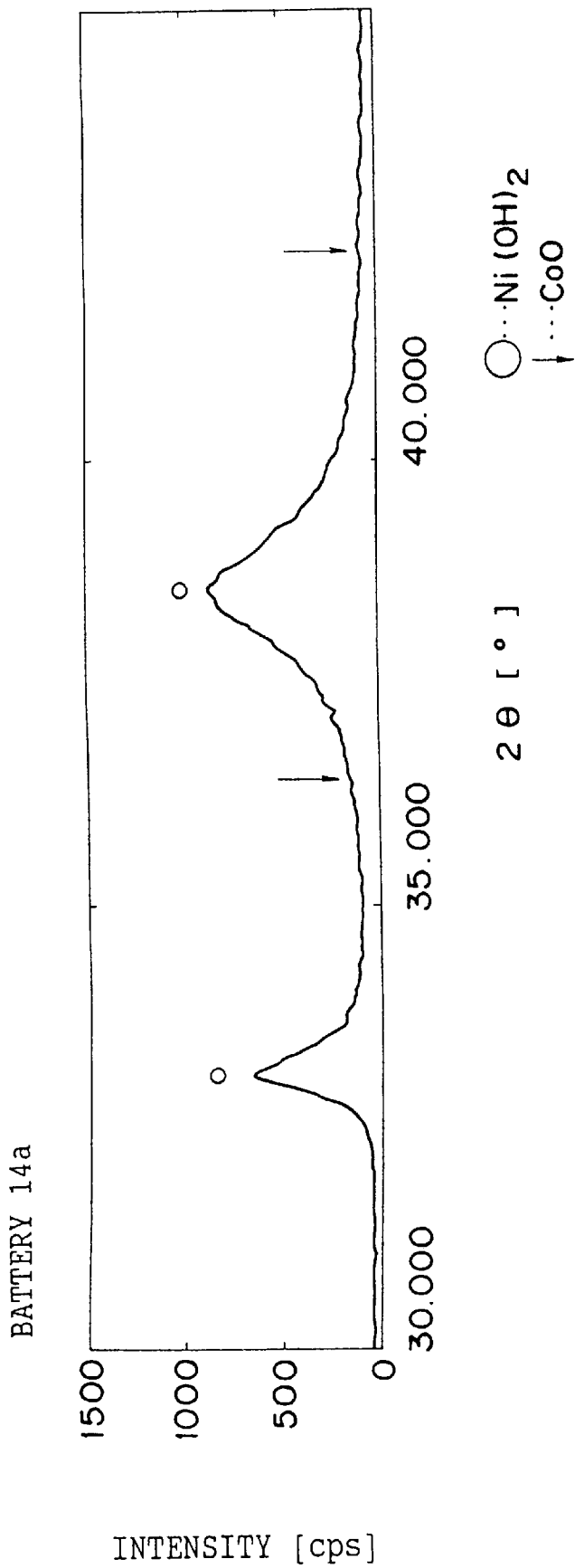
Figure 27:
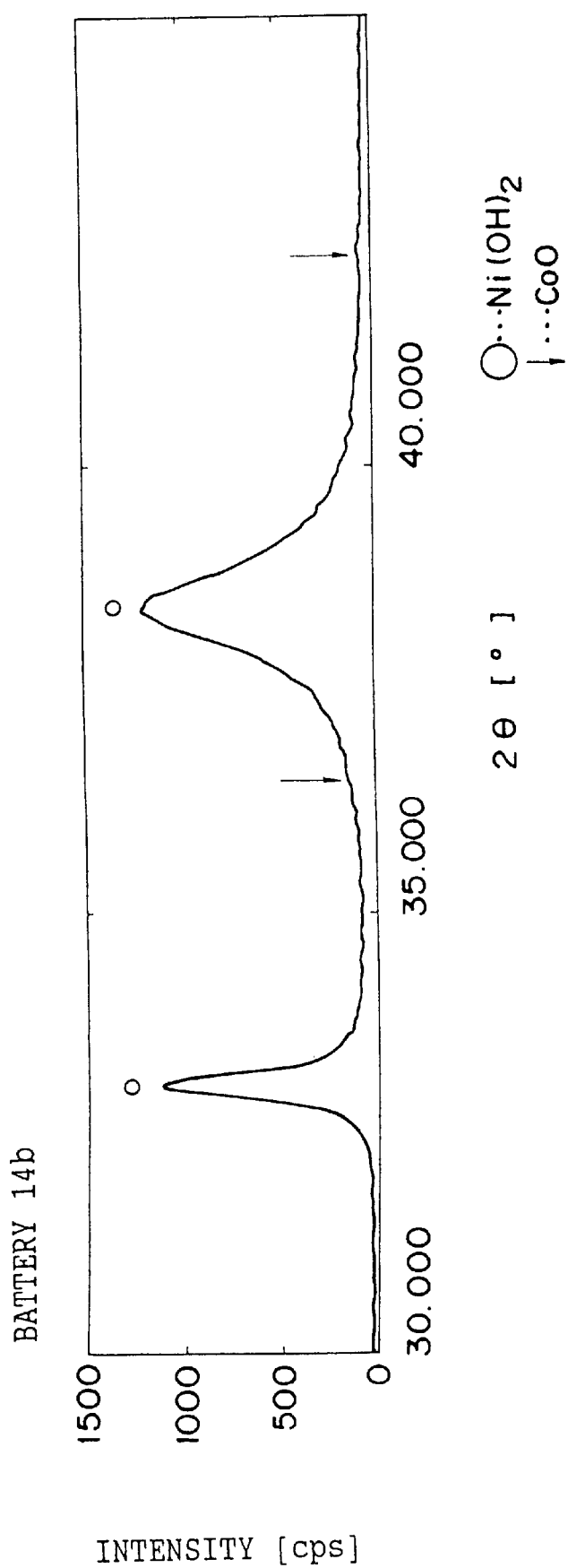
Figure 28:
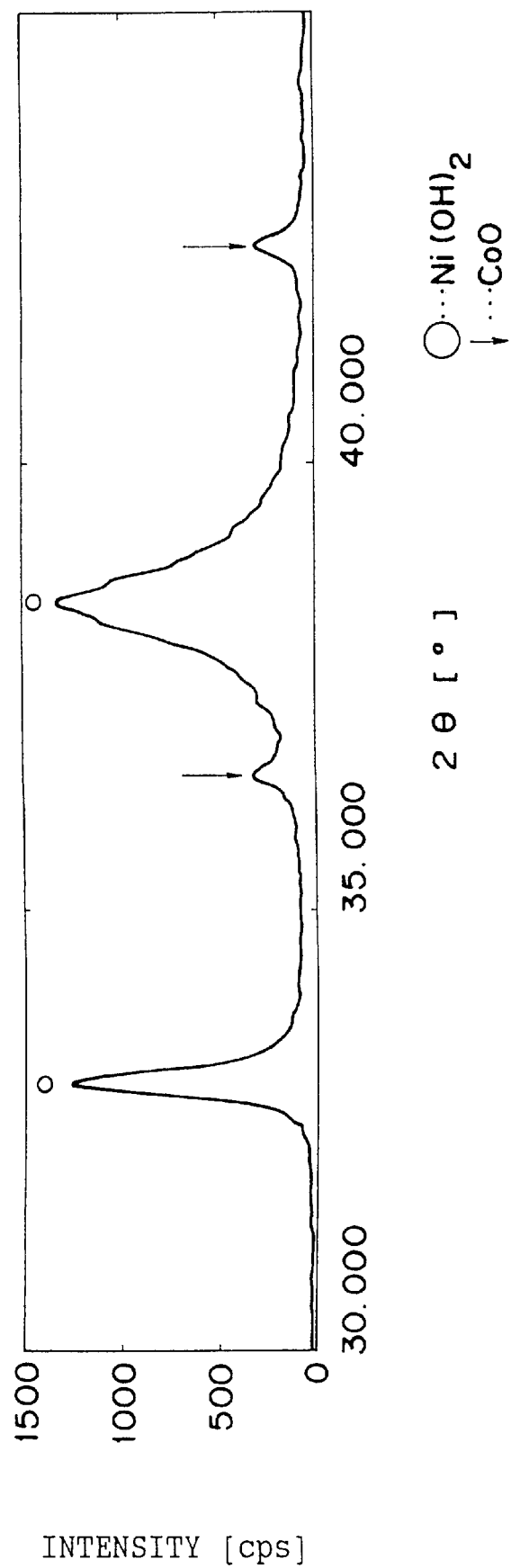
Figure 29:
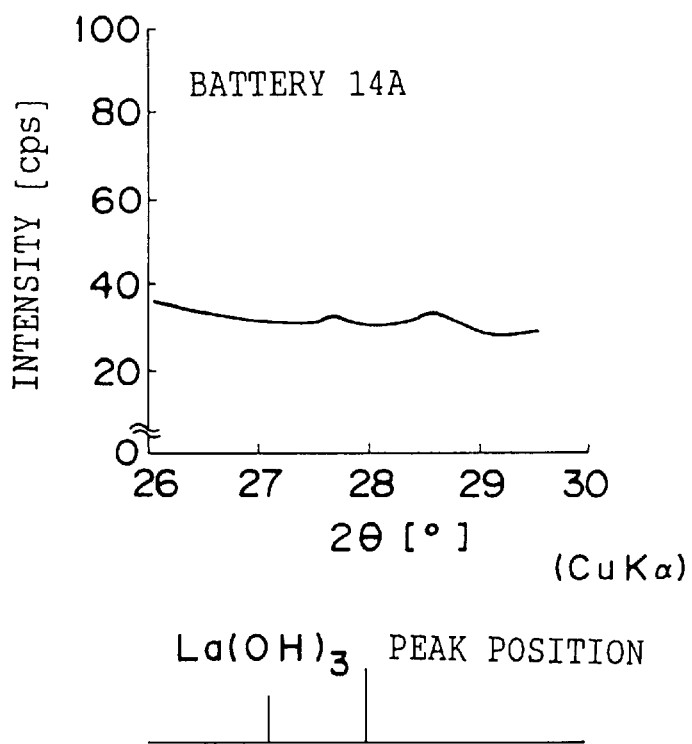
FIG. 29 through FIG. 33 are graphs showing the X-ray diffraction patterns for active materials of hydrogen absorbing electrodes of example 14.
Figure 30:
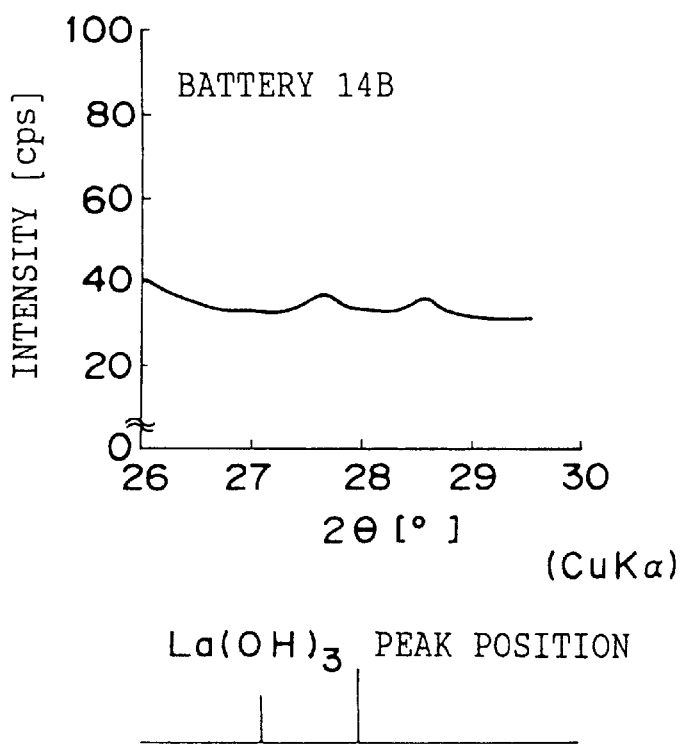
Figure 31:
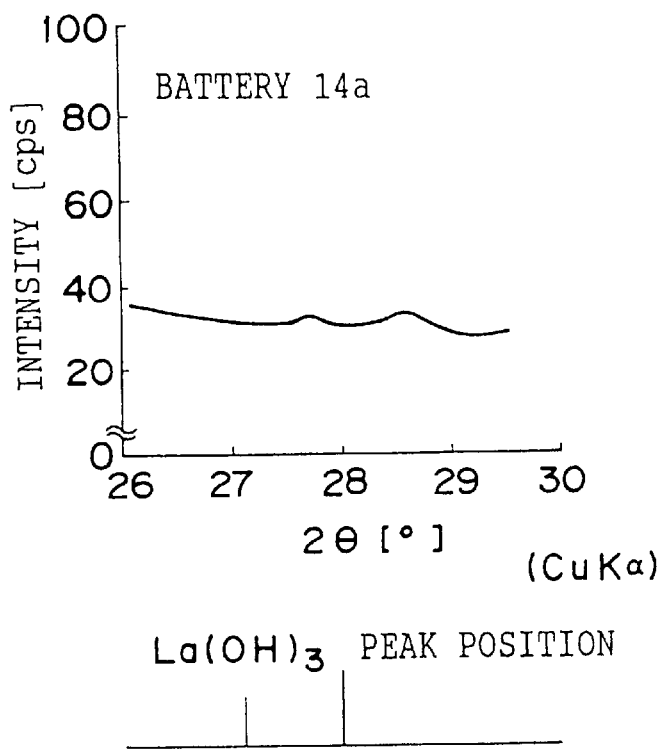
Figure 32:
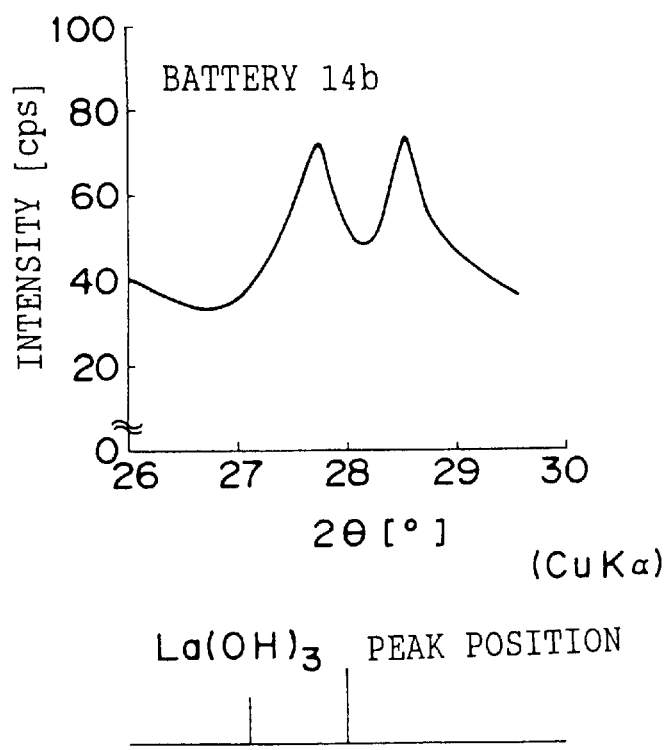

FIG. 23 through FIG. 28 show X-ray diffraction patterns for the active materials of the nickel electrodes. FIG. 23 is a general view of the X-ray diffraction pattern for the example battery 14A. FIG. 24, FIG. 25, FIG. 26 and FIG. 27 are partially enlarged views of the X-ray diffraction patterns for the example batteries 14A & 14B and the comparison batteries 14a & 14b, respectively. Enlarged ranges are those corresponding to a part X of FIG. 23. FIG. 28 shows the X-ray diffraction pattern of the active material for the nickel electrode before subjected to the activation and charging/discharging.

As obvious from these figures, $\beta\text{-Ni(OH)}_2$ peaks are conspicuous but CoO peaks are hardly seen in all the batteries. This fact implies that, in any example batteries 14A & 14B and the comparison battery 14a, the dissolution control effect of $Yb_2O_3$ does hardly interfere with the dissolution and deposition of CoO and the conductive network is sufficiently formed.

Figure 33:
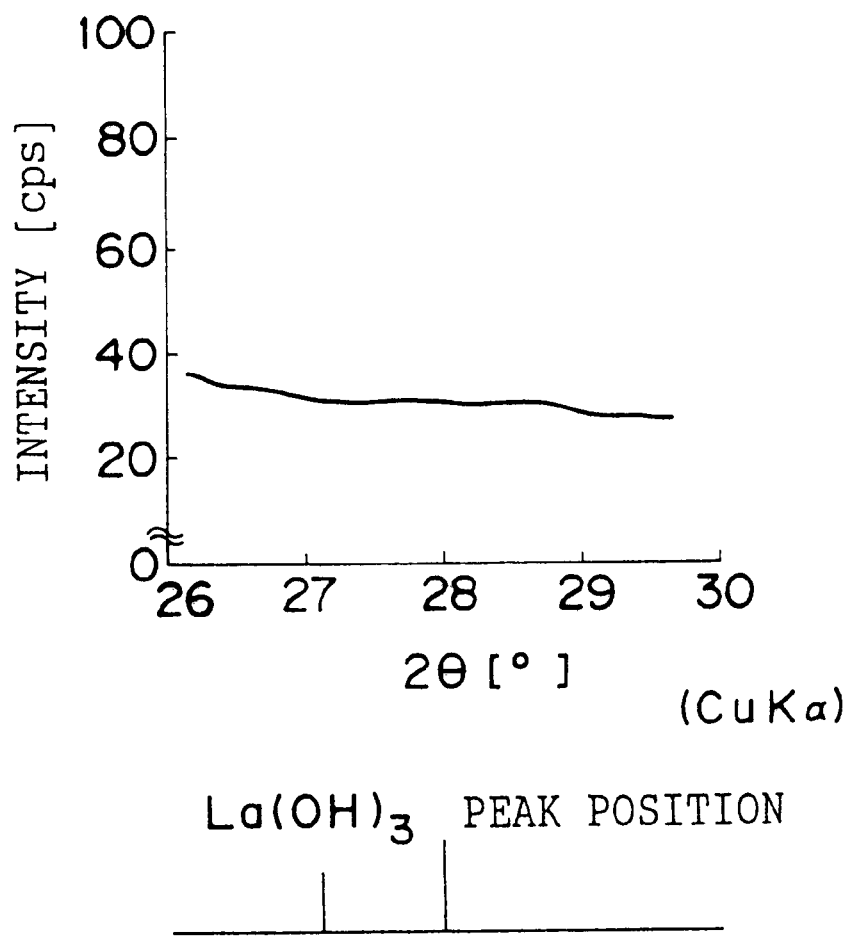

FIG. 29 through FIG. 33 show X-ray diffraction patterns for the active materials of the hydrogen absorbing electrodes. FIG. 29, FIG. 30, FIG. 31 and FIG. 32 are partially enlarged views of the X-ray diffraction patterns for the example batteries 14A & 14B and the comparison batteries 14a & 14b, respectively. FIG. 33 shows the partially enlarged view of X-ray diffraction pattern of the active material for the hydrogen absorbing electrode before subjected to the activation and charging/discharging.

As obvious from these figures, peaks of rare earth element hydroxide caused by the alloy corrosion appear in the vicinity of $2\theta=27°\sim29°$ in the comparison battery 14b. In any of the example batteries 14A & 14B and the comparison battery 14a, however, the subject peaks are small so that the alloy corrosion are controlled.

As mentioned above, according to the alkaline storage batteries of this example, the decrease in charge efficiency at high temperature can be controlled without lowering the discharge potential, electrode capacity and energy density etc. of the nickel electrode. Therefore, the charge/discharge efficiency can be improved over a wide range of temperature. Further, the cycle life can be prolonged because the alloy corrosion of the hydrogen absorbing electrode can be controlled.

In this case, rare earth elements such as Er may be used in place of Yb, and a hydroxide such as $Yb(OH)_3$ or fluoride may be used in place of the oxide such as $Yb_2O_3$.

The same effect may be brought about, not only in the nickel hydride storage battery but in the alkaline storage battery, in which paste-type nickel electrodes having principal component of nickel hydroxide are used for their positive electrodes, such as nickel-cadmium storage battery and the nickel-zinc storage battery etc.

EXAMPLE 15

This example relates to an alkaline storage battery.

[Making-up of Battery]

High-density nickel hydroxide powder was sufficiently mixed with 10 wt % of CoO powder, and added with a thickener to be formed into a paste. The paste was filled in a nickel porous substrate, dried and pressed to a specified thickness so as to make up a nickel electrode. An electrode group controlled in its positive electrode capacity was constructed by this nickel electrode together with a well-known hydrogen absorbing electrode and a separator having alkali resistance. Electrolytes having various components as listed in Table 5 were poured into that electrode group so as to make up nickel hydride storage batteries. As listed in Table 5, batteries using electrolytes containing Yb are named as example batteries 15A & 15B, and those using electrolytes not containing Yb are named as comparison batteries 15a & 15b.

[TABLE 5]

| | electrolyte components | | | |
|---|---|---|---|---|
| battery | KOH concentration | LiOH concentration | NaOH concentration | Yb concentration |
| 15A | 6 N | — | — | $3 \times 10^{-3}$ N |
| 15B | 5 N | 1 N | 1 N | $3 \times 10^{-3}$ N |
| 15a | 6 N | — | — | — |
| 15b | 5 N | 1 N | 1 N | — |

[Test]

Charge/discharge cycle tests were done on the foregoing batteries using Hg/HgO electrodes for serving as reference electrodes under open and excessive electrolyte conditions.

Figure 34:
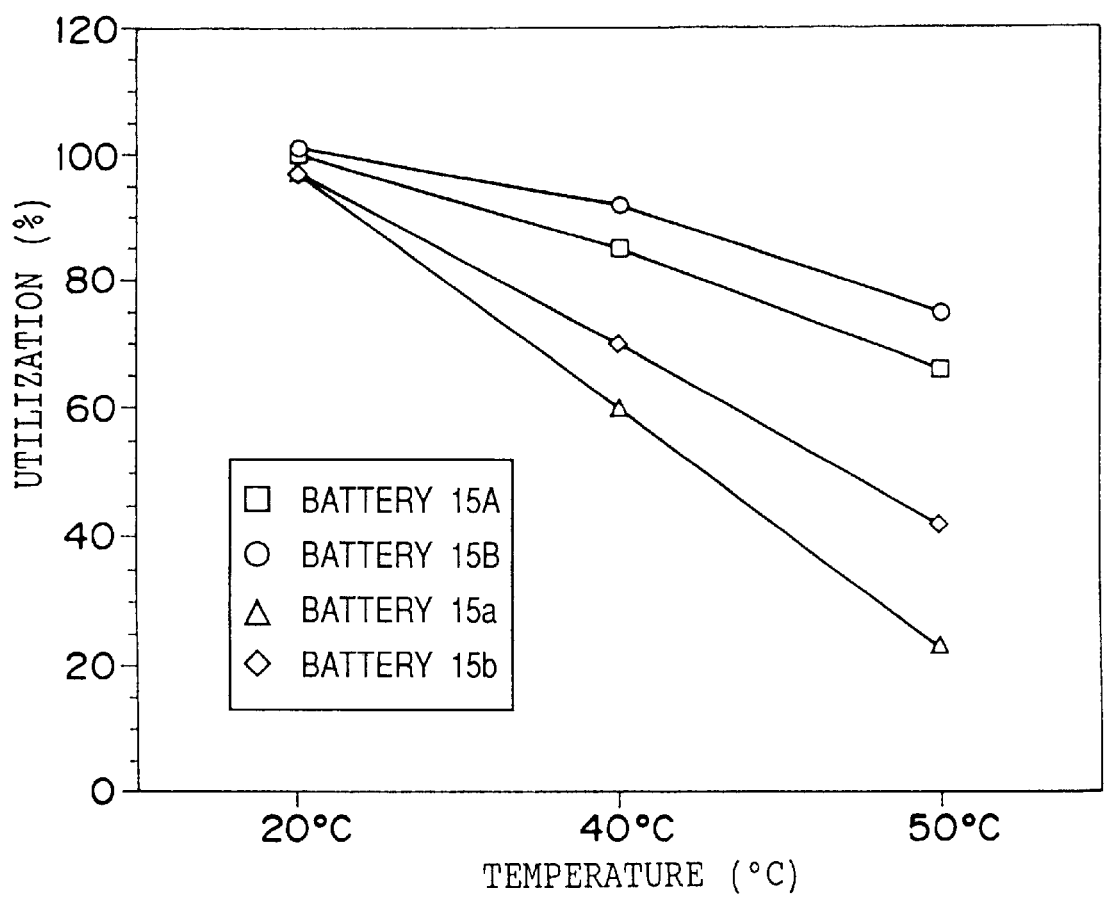
FIG. 34 is a graph showing relations between the temperature and the utilization for batteries of example 15.

FIG. 34 show utilization at various temperatures. The utilization represents that corresponding to the theoretical capacity. The example batteries 15A & 15B were superior to the comparison battery 5a in terms of the utilization, and differences were remarkable at high temperatures of 40° C. and 50° C. The example battery 15B offered remarkably higher utilization than that of the comparison battery 15b.

Figure 35:
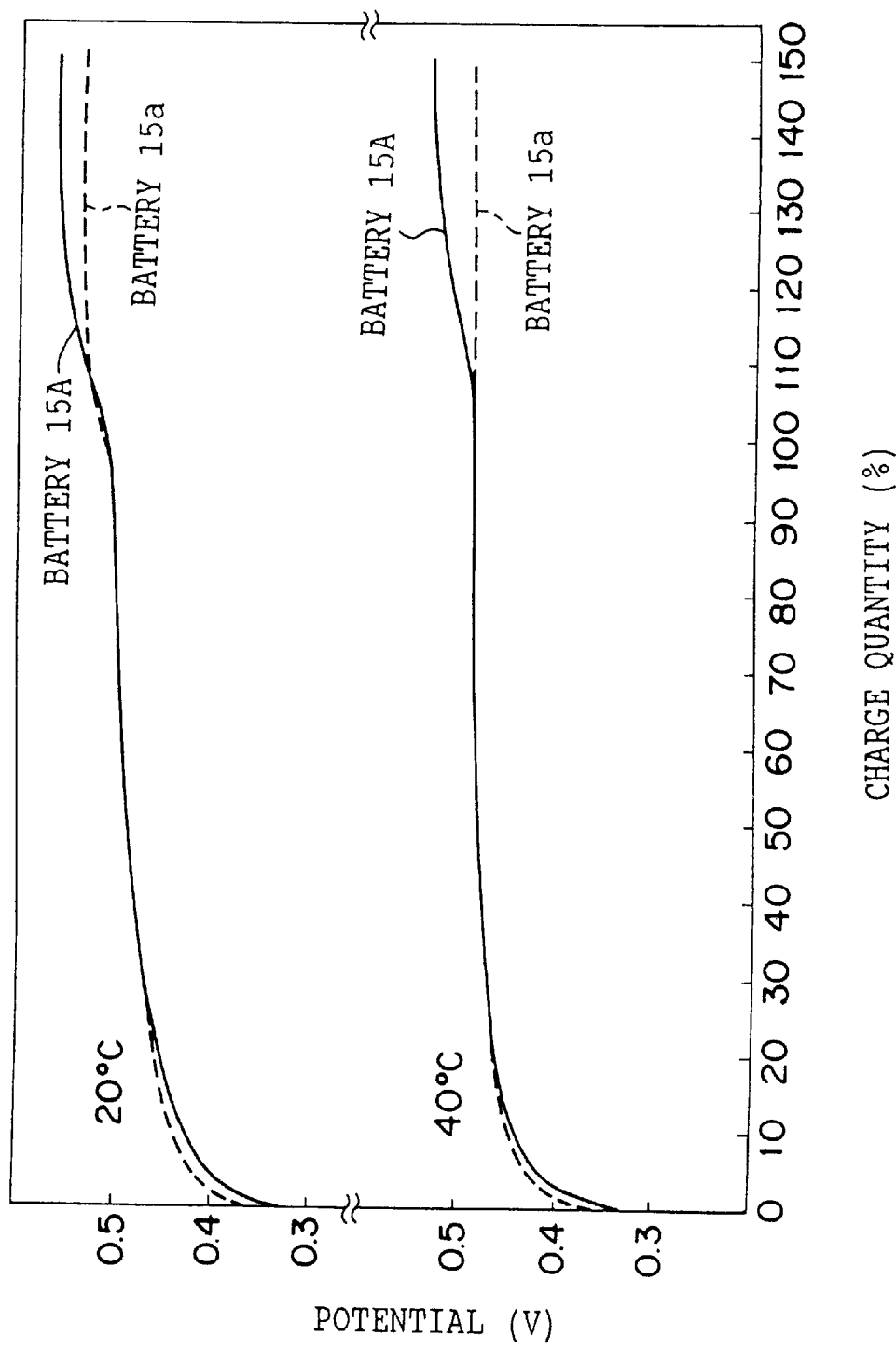
FIG. 35 is a graph showing the charge curves at 20° C. and 40° C. for batteries of example 15.

FIG. 35 shows charge curves of positive electrodes in the example battery 15A and the comparison battery 15a at 20° C. and 40° C. The charge quantity represented by the axis of abscissa indicates that corresponding to the theoretical capacity. At 20° C., oxygen evolution overvoltages of the both batteries 15A, 15a are approximately equal. However, the oxygen overvoltage does not rise even in the final stage of charging, in the comparison battery 15a at 40° C. Therefore, it can be understood that the charge acceptance is reduced. On the contrary, the oxygen overvoltage rises even in the final stage of charging and a high utilization is obtained even at 40° C. in the example battery 15A. Also in the comparison battery 15b, a high utilization is maintained at high temperature in the same way as the example battery 15A. This is caused by the oxygen evolution overvoltage rise effect owing to Yb ion in the electrolyte.

As mentioned above, according to the alkaline storage batteries of this example, the utilization of the nickel electrode can be increased and the decrease in the utilization at high temperature can be prevented.

What is claimed is:

1. A hydrogen absorbing electrode, comprising:
   a hydrogen absorbing alloy capable of absorbing and releasing hydrogen, said alloy comprising a rare earth element having a basicity weaker than that of lanthanum,
   wherein the alloy is previously subjected to a dipping treatment by using an alkali aqueous solution or a weak acidic aqueous solution.

2. A hydrogen absorbing electrode as set forth in claim 1, in which the rare earth element is selected from the group consisting of samarium, gadolinium, terbium, dysprosium, holmium, erbium, thulium and ytterbium.

3. A nickel electrode, consisting essentially of:
   a nickel hydroxide for serving as an active material containing at least one element selected from the group consisting of cobalt, zinc, cadmium, and magnesium, as a solid solution,
   wherein the nickel hydroxide is mixed with a rare earth element selected from the group consisting of yttrium, holmium, erbium, thulium, ytterbium, europium lutetium, and compounds thereof; and
   wherein an internal pore volume of the nickel hydroxide is smaller than or equal to 0.1 ml/g.

4. A nickel electrode as set forth in claim 3, in which the compound of rare earth element is selected from the group consisting of an oxide, a hydroxide and a halogenide.

5. A nickel electrode, comprising:
   a nickel hydroxide for serving as an active material having a component according to the following equation $(Ni_{1-a}X_bCo_cZn_d)(OH)_2$, wherein X, cobalt and zinc are contained as a solid solution, and X is at least one element selected from the group consisting of ytterbium, europium, lutetium and erbium; $a=b+c+d$; and $0.02 \leq a \leq 0.20$, $0 \leq c < 0.20$, $0 \leq d < 0.20$.

6. A nickel electrode, comprising:
   a nickel hydroxide for serving as an active material mixed with
   a compound comprising ytterbium and lutetium and optionally an element selected from the group consisting of yttrium, holmium, erbium, and thulium, and
   a cobalt compound.

7. A nickel electrode comprising a nickel hydroxide for serving as an active material mixed with
   a compound comprising at least ytterbium and lutetium and an element selected from the group consisting of yttrium, holmium, erbium, and thulium in a mixed state or as a composite compound; and
   a cobalt compound.

8. A nickel electrode comprising a nickel hydroxide for serving as an active material mixed with
   a compound comprising ytterbium and lutetium and optionally an element selected from the group consisting of yttrium, holmium, erbium, and thulium; and
   a cobalt compound,
   in which ytterbium and lutetium larger than or equal to 35 wt % when converted to a quantity of oxide, and a ratio of a content of ytterbium to contents of ytterbium and lutetium is larger than or equal to 0.75 when converted to the quantity of oxide.

9. A nickel electrode comprising a nickel hydroxide for serving as an active material mixed with
   at least one compound consisting essentially of at least one element selected from the group consisting of holmium, erbium, thulium, ytterbium, and lutetium; and
   a cobalt compound,
   in which a percentage of the metallic cobalt is smaller than or equal to 3 wt % in the selected cobalt compound.

10. An alkaline storage battery comprising:
    a nickel electrode,
    a negative electrode,
    a separator, and
    an alkaline electrolyte,
    wherein said nickel electrode consists essentially of a nickel hydroxide for serving as an active material,
    wherein an internal pore volume of the nickel hydroxide is smaller than or equal to 0.1 ml/g, and
    wherein a rare earth element or a compound thereof is coated on a surface of the nickel electrode.

11. An alkaline storage battery comprising:
    a nickel electrode comprising a nickel hydroxide for serving as an active material,
    a negative electrode,
    a separator coated on the surface with a compound comprising a rare earth element, and
    an alkali electrolyte.

12. An alkaline storage battery as set forth in claim 11, in which the coating is carried out at least on a positive electrode-side face of the separator.

13. An alkaline storage battery as set forth in claim 10, in which a weight percentage of coating is 0.1 wt % to 10 wt % relative to a quantity of the positive active material.

14. An alkaline storage battery equipped with a nickel electrode utilizing a nickel hydroxide for serving as an active material, a negative electrode, a separator and an alkali electrolyte wherein,
    a rare earth element or a compound thereof is dissolved in the alkali electrolyte.

15. An alkaline storage battery as set forth in claim 14, in which the alkali electrolyte has a principal component of potassium hydroxide and contains sodium hydroxide or lithium hydroxide.

16. An alkaline storage battery as set forth in claim 10, in which the rare earth element is ytterbium.

17. An alkaline storage battery as set forth in claim 10, in which the compound of rare earth element is an oxide, a hydroxide or a halogenide.

18. An alkaline storage battery as set forth in claim 11, in which a weight percentage of coating is 0.1 wt % to 10 wt % relative to a quantity of the positive active material.

19. An alkaline storage battery as set forth in claim 11, in which the rare earth element is ytterbium.

20. An alkaline storage battery as set forth in claim 11, in which the compound of rare earth element is an oxide, a hydroxide or a halogenide.

21. An alkaline storage battery as set forth in claim 14, in which the rare earth element is ytterbium.

22. An alkaline storage battery as set forth in claim 14, in which the compound of rare earth element is an oxide, a hydroxide or a halogenide.

23. A nickel electrode, comprising:

a nickel hydroxide for serving as an active material mixed with:
a compound comprising at least ytterbium and lutetium and an element selected from the group consisting of yttrium, holmium, erbium, and thulium, and
a cobalt compound.

24. A nickel electrode comprising a nickel hydroxide for serving as an active material mixed with a compound comprising at least ytterbium and lutetium and an element selected from the group consisting of yttrium, holmium, erbium, and thulium; and a cobalt compound, in which ytterbium and lutetium larger than or equal to 35 wt % when converted to a quantity of oxide, and a ratio of a content of ytterbium to contents of ytterbium and lutetium is larger than or equal to 0.75 when converted to the quantity of oxide.

25. A nickel electrode as set forth in claim 3, in which the compound of a rare earth element is not in solid solution but is in a physically mixed state with the active material.

* * * * *